US012646754B2

(12) United States Patent
Yan et al.

(10) Patent No.: US 12,646,754 B2
(45) Date of Patent: Jun. 2, 2026

(54) SECONDARY BATTERY AND BATTERY MODULE

(71) Applicant: NINGDE AMPEREX TECHNOLOGY LIMITED, Ningde City (CN)

(72) Inventors: Dongyang Yan, Ningde City (CN); Shenzhao Qiu, Ningde City (CN); Fei Wu, Ningde City (CN)

(73) Assignee: NINGDE AMPEREX TECHNOLOGY LIMITED, Ningde City (CN)

( * ) Notice: Subject to any disclaimer, the term of this patent is extended or adjusted under 35 U.S.C. 154(b) by 794 days.

(21) Appl. No.: 17/710,188

(22) Filed: Mar. 31, 2022

(65) Prior Publication Data

US 2022/0223918 A1      Jul. 14, 2022

Related U.S. Application Data

(63) Continuation of application No. PCT/CN2021/094549, filed on May 19, 2021.

(30) Foreign Application Priority Data

Sep. 29, 2020    (CN) ......................... 202011052243.1

(51) Int. Cl.
*H01M 10/0583* (2010.01)
*H01M 10/0525* (2010.01)

(52) U.S. Cl.
CPC ... *H01M 10/0583* (2013.01); *H01M 10/0525* (2013.01)

(58) Field of Classification Search
CPC . H01M 10/0585; H01M 10/0583; H01M 4/13
See application file for complete search history.

(56) References Cited

U.S. PATENT DOCUMENTS

2007/0202401 A1 *   8/2007   Viavattine ......... H01M 10/0583
                                                           429/231.95
2009/0053592 A1      2/2009   Mino et al.
                              (Continued)

FOREIGN PATENT DOCUMENTS

CN          101167203 A      4/2008
CN          101958430 A      1/2011
            (Continued)

OTHER PUBLICATIONS

JP2016111020-machine-trans (Year: 2016).*
            (Continued)

*Primary Examiner* — Miriam Stagg
*Assistant Examiner* — Brent C Thomas
(74) *Attorney, Agent, or Firm* — WHDA, LLP

(57) ABSTRACT

A secondary battery includes a first electrode sheet including a plurality of first conductive layers and a plurality of first bending portions and a second electrode sheet including a plurality of second conductive layers and a plurality of second bending portions. Two adjacent first conductive layers are connected through one of the first bending portions, and two adjacent second conductive layers are connected through one of the second bending portions. The plurality of first conductive layers and the plurality of second conductive layers are alternately stacked. Viewed along the first direction perpendicular to a surface of the first conductive layer, each first bending portion includes a first edge extending along a second direction perpendicular to the first direction; and each second bending portion includes a second edge extending along a third direction perpendicular to the first direction. The second direction is different from the third direction.

28 Claims, 29 Drawing Sheets

(56)     References Cited

U.S. PATENT DOCUMENTS

| | | | |
|---|---|---|---|
| 2016/0285133 A1 | 9/2016 | Baumeister et al. | |
| 2017/0149092 A1* | 5/2017 | Zhu | H01M 10/0431 |

FOREIGN PATENT DOCUMENTS

| | | | | |
|---|---|---|---|---|
| CN | 102664285 | A | | 9/2012 |
| CN | 105849962 | A | | 8/2016 |
| CN | 205921045 | U | | 2/2017 |
| CN | 206322808 | U | | 7/2017 |
| CN | 108475826 | A | | 8/2018 |
| CN | 110071331 | A | | 7/2019 |
| CN | 112103470 | A | | 12/2020 |
| JP | H0864225 | A | * | 3/1996 |
| JP | 2001-357892 | A | | 12/2001 |
| JP | 2003-077457 | A | | 3/2003 |
| JP | 2005-243455 | A | | 9/2005 |
| JP | 2010-080427 | A | | 4/2010 |
| JP | 2011-138675 | A | | 7/2011 |
| JP | 2014-101478 | A | | 6/2014 |
| JP | 2015-501076 | A | | 1/2015 |
| JP | 2015-506563 | A | | 3/2015 |
| JP | 2015-513191 | A | | 4/2015 |
| JP | 2016111020 | A | * | 6/2016 |
| JP | 2016-541103 | A | | 12/2016 |
| JP | 2018-073647 | A | | 5/2018 |
| JP | 2018-535526 | A | | 11/2018 |
| JP | 2020-119629 | A | | 8/2020 |

OTHER PUBLICATIONS

JP-H0864225 original and machine translation (Year: 1996).*
International Search Report dated Jun. 28, 2021, issued in counterpart Application No. PCT/CN2021/094549, with English Translation. (8 pages).
Office Action dated Jun. 1, 2021, issued in counterpart CN Application No. 202011052243.1, with English Translation. (18 pages).
Notice of Allowance dated Dec. 1, 2021, issued in counterpart CN Application No. 202011052243.1, with English Translation. (6 pages).
Office Action dated Jan. 24, 2023, issued in counterpart JP Application No. 2021-534786, with English translation. (14 pages).
Notice of Allowance dated Jul. 25, 2023, issued in counterpart JP Application No. 2021-534786, with English translation. (6 pages).

* cited by examiner

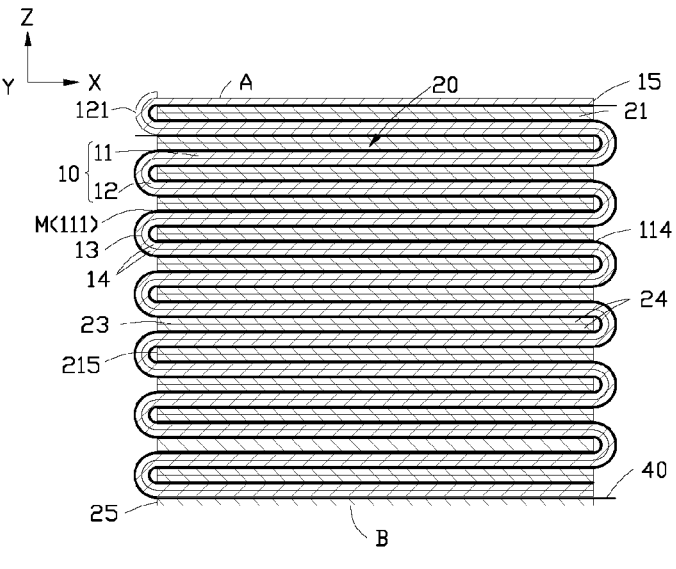
FIG. 23
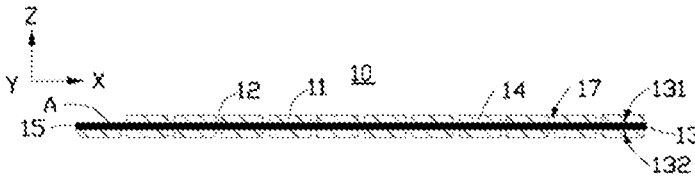
FIG. 24
FIG. 25

SECONDARY BATTERY AND BATTERY MODULE

CROSS REFERENCE TO RELATED APPLICATION

This application is a continuation application of PCT Patent Application Ser. No. PCT/CN2021/094549, filed on Mar. 19, 2021, which claims priority to Chinese Patent Application Ser. No. 202011052243.1, filed with the China National Intellectual Property Administration on Sep. 29, 2020, all of which are incorporated herein by reference in their entirety.

TECHNICAL FIELD

This application relates to a secondary battery and a battery module.

BACKGROUND

Existing rechargeable secondary batteries of conventional structures are commonly used in products such as mobile phones, notebooks, and electric vehicles. Such products are large in size whose extractable capacity requires a relatively high spatial occupancy. However, emergence of small portable electronic products imposes an increasingly high requirement on the battery size. If the internal structure of a conventional secondary battery is applied to a battery of a limit size, energy density needs to be further improved.

SUMMARY

This application provides a secondary battery, including a first electrode sheet and a second electrode sheet. The first electrode sheet includes a plurality of first conductive layers and a plurality of first bending portions, and two adjacent first conductive layers are connected through one of the first bending portions. The second electrode sheet includes a plurality of second conductive layers and a plurality of second bending portions, and two adjacent second conductive layers are connected through one of the second bending portions. The plurality of first conductive layers and the plurality of second conductive layers are alternately stacked. Viewed along the first direction perpendicular to a surface of the first conductive layer, each first bending portion includes a first edge, the first edge extends along a second direction perpendicular to the first direction; and each second bending portion includes a second edge, the second edge extends along a third direction perpendicular to the first direction. The second direction is different from the third direction.

BRIEF DESCRIPTION OF DRAWINGS

FIG. 23 is a schematic cross-sectional view showing that the first electrode sheet exposing the first metal layer and the second electrode sheet exposing the second metal layer are stacked.

FIG. 24 is a schematic vertical view of the unfolded first electrode sheet in FIG. 15 with an active layer on a first bending portion removed.

FIG. 25 is a schematic cross-sectional view of the first electrode sheet in FIG. 24 along an E-E direction.

Figure 1:
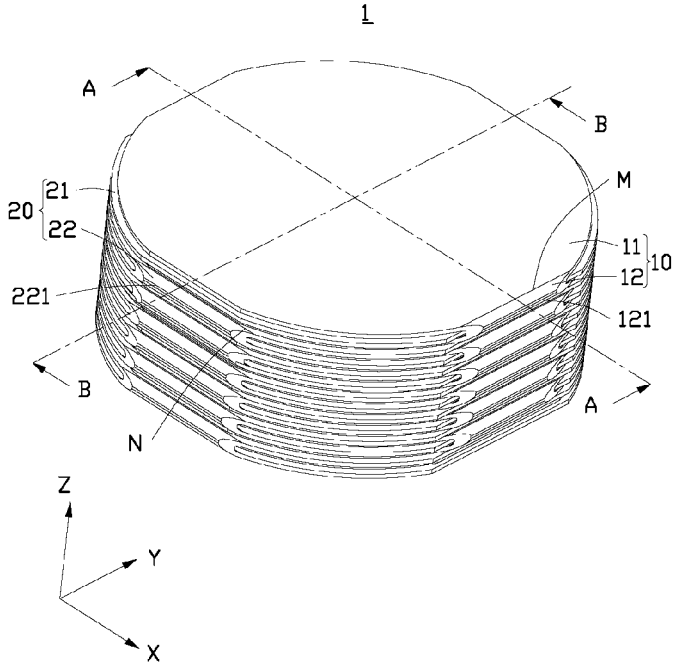
FIG. 1 is a three-dimensional schematic diagram of a secondary battery according to a first embodiment of this application.

REFERENCE SIGNS OF MAIN COMPONENTS secondary battery 1
first electrode sheet 10
first conductive layer 11
first side 111
first region 112
second region 113, 116
second side 114
first side edge 115, 115'
first distance $H_1$
first point $O_1$
second point $O_2$
second distance $H_2$
third point $I_1$
fourth point $I_2$
distance between the first side and the $K_1$
second conductive layer
distance between the second side and the $K_2$
second conductive layer
first distance $L_1$
second distance $L_2$
first bending portion 12
first edge 121, 121a
first boundary M
first metal layer 13
first surface 131
second surface 132
fifth region A
first material layer 14
first end portion 15
first layer 16
first exposed portion 17
first opening 18
second electrode sheet 20
second conductive layer 21
third side 211
third region 212
fourth region 213, 216
fourth side 214
second side edge 215, 215'
third distance $H_3$
fifth point $O_3$
sixth point $O_4$
fourth distance $H_4$
seventh point $I_3$ eighth point I$_4$ distance between the third side and the K$_3$ first conductive layer distance between the fourth side and the K$_4$ first conductive layer second bending portion 22 second edge 221, 221*a* second boundary N second metal layer 23 third surface 231 fourth surface 232 sixth region B second material layer 24 second end portion 25 second exposed portion 27 second opening 28 length D1, D2, D3, D4, D5, D6 conductive sheet 30 first conductive sheet 31 second conductive sheet 32 separator 40 battery module 100 first package 50 first cover body 51 pole 52 first insulator 53 second package 60 second cover body 61 shell 62 second insulator 63 through hole 54*a*, 64*a*, 64*b* connector 70 first connector 71 second connector 72 first direction Z second direction Y third direction X electronic apparatus 200 main body 80

DETAILED DESCRIPTION

The following describes the technical solutions in the embodiments of this application clearly and in detail. Apparently, the described embodiments are a part rather than all of the embodiments of this application. Unless otherwise defined, all technical and scientific terms used herein shall have the same meanings as commonly understood by those skilled in the art to which this application belongs. The terms used in the specification of this application are intended to describe specific embodiments but not intended to constitute any limitation on this application.

The following describes the embodiments of this application in detail. However, this application may be embodied in many different forms, and should not be construed as being limited to the example embodiments explained herein. Rather, these example embodiments are provided so that this application may be conveyed to those skilled in the art thoroughly and in detail.

In addition, for brevity and clarity, in the accompanying drawings, sizes or thicknesses of various components and layers may be enlarged. As used herein, the term "and/or" includes any and all combinations of one or more related listed items. In addition, it should be understood that when an element A is referred to as "connecting" an element B, the element A may be directly connected to the element B, or there may be an intermediate element C and the element A and the element B may be indirectly connected to each other.

Further, the use of "may" when describing the embodiments of this application refers to "one or more embodiments of this application".

The terminology used herein is for the purpose of describing specific embodiments and is not intended to limit this application. As used herein, singular forms are intended to also include plural forms, unless the context clearly specifies otherwise. It should be further understood that the term "including", when used in this specification, refers to the presence of the described features, values, steps, operations, elements, and/or components, but does not exclude the presence or addition of one or more other features, values, steps, operations, elements, components, and/or combinations thereof.

Spatial related terms such as "above" may be used herein for ease of description to describe the relationship between one element or feature and another element (a plurality of elements) or feature (a plurality of features) as illustrated in the figure. It should be understood that, in addition to the directions described in the figures, the spatial related terms are intended to include different directions in the use or operation of devices or apparatus. For example, if a device in the figure is turned over, an element described as "on" or "above" another element or feature should be oriented "below" or "under" the another element or feature. Therefore, the example term "above" may include directions of above and below. It should be understood that although the terms first, second, third, or the like may be used herein to describe various elements, components, regions, layers, and/or portions, these elements, components, regions, layers, and/or portions should not be limited by these terms. These terms are used to distinguish one element, component, region, layer, or portion from another element, component, region, layer, or portion. Therefore, the first element, component, region, layer, or portion discussed below may be referred to as the second element, component, region, layer, or portion without departing from the teachings of the example embodiments.

This application provides a secondary battery, including a first electrode sheet and a second electrode sheet. The first electrode sheet includes a plurality of first conductive layers and a plurality of first bending portions, and two adjacent first conductive layers are connected through one of the first bending portions. The second electrode sheet includes a plurality of second conductive layers and a plurality of second bending portions, and two adjacent second conductive layers are connected through one of the second bending portions. The plurality of first conductive layers and the plurality of second conductive layers are alternately stacked. Viewed along the first direction perpendicular to a surface of the first conductive layer, each first bending portion includes a first edge, the first edge extends along a second direction perpendicular to the first direction, and each second bending portion includes a second edge, the second edge extends along a third direction perpendicular to the first direction. The second direction is different from the third direction.

In the foregoing secondary battery, the first electrode sheet and the second electrode sheet are alternately bent in different directions, so that the first electrode sheet and the second electrode sheet are stacked in the first direction. Based on the secondary battery, more electrode sheets may be accommodated in limited space, thereby increasing energy density of the secondary battery.

The following describes some embodiments of this application in detail. In absence of conflicts, the following embodiments and features in the embodiments may be combined.

First Embodiment

Referring to FIG. 1, a secondary battery 1 includes a first electrode sheet 10 and a second electrode sheet 20. The first electrode sheet 10 includes a plurality of first conductive layers 11 and a plurality of first bending portions 12, and two adjacent first conductive layers 11 are connected through one of the first bending portions 12. There is a first boundary M between the first conductive layer 11 and the first bending portion 12, and the first boundary M is a position at which the first conductive layer 11 and the first bending portion 12 are connected. The second electrode sheet 20 includes a plurality of second conductive layers 21 and a plurality of second bending portions 22, and two adjacent second conductive layers 21 are connected through one of the second bending portions 22. There is a second boundary N between the second conductive layer 21 and the second bending portion 22, and the second boundary N is a position at which the second conductive layer 21 and the second bending portion 22 are connected.

The plurality of first conductive layers 11 and the plurality of second conductive layers 21 are alternately stacked. A direction perpendicular to the first conductive layer 11 and the second conductive layer 21 is defined as a first direction Z. Viewed along the first direction Z, each first bending portion 12 includes a first edge 121, and the first edge 121 extends along a second direction Y. Each second bending portion 22 includes a second edge 221, and the second edge 221 extends along a third direction X. A predetermined angle is defined between the second direction Y and the third direction X.

Figure 2:
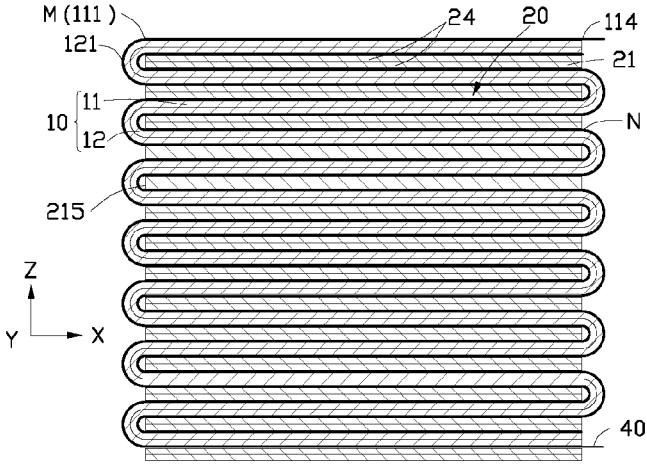
FIG. 2 is a schematic cross-sectional view of the secondary battery shown in FIG. 1 along an A-A direction.

The secondary battery 1 is further explained below. Referring to FIG. 2, the plurality of first conductive layers 11 included in the first electrode sheet 10 are stacked in the first direction Z. The first bending portions 12 are located on both sides of the first conductive layer 11 for connecting two adjacent first conductive layers 11, and each of the first bending portions 12 is connected to the first conductive layer 11 at the position of the first boundary M.

In an embodiment, the first conductive layer 11 and the plurality of first bending portions 12 may be an integrally formed structure, so that the first electrode sheet 10 may be folded and stacked more conveniently.

Figure 3:
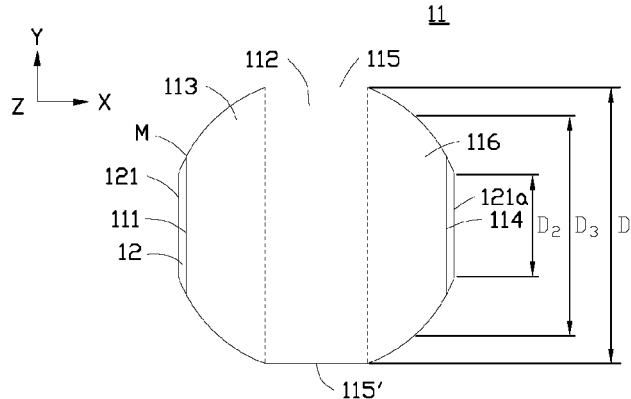
FIG. 3 is a schematic vertical view of a stacked first electrode sheet.

Referring to FIG. 3, the first conductive layer 11 is viewed along the first direction Z. The first conductive layer 11 includes a first side 111 and a first region 112. The first side 111 is an edge portion of the first conductive layer 11; Further, the first side 111 and the first boundary M refer to the same structure. The first side 111 is to better illustrate the structure and component of the first conductive layer 11, and the first boundary M is to better distinguish between the first conductive layer 11 and the first bending portion 12. The first region 112 is approximately located at the middle of the first conductive layer 11. Specifically, the first region 112 is a region between two dotted lines in FIG. 3.

In the second direction Y, a length of the first region 112 is $D_1$, a length of the first side 111 is $D_2$, and $D_1$ is greater than $D_2$. An area of the middle of the first conductive layer 11 is greater than an area of the edge, so that an overall area of the first conductive layer 11 is increased, thereby increasing energy density of the first conductive layer 11.

Referring to FIG. 3, in an embodiment, the first conductive layer 11 further includes a second region 113. The second region 113 is located between the first side 111 and the first region 112, and connects the first side 111 and the first region 112. Further, the second region 113 is a region between the first side 111 and a dotted line that is one of the two dotted lines used as boundaries of the first region 112 in FIG. 3 and that is closer to the first side 111 than to a second side 114. In the second direction Y, a length of the second region 113 is $D_3$, and $D_3$ is between $D_1$ and $D_2$, that is, the length of the second region 113 is greater than the length of the first side 111 and less than the length of a first region 112. Therefore, when the length of the first conductive portion in the second direction X is extended from first side 111 to the first region 112, an area of the first conductive layer 11 is gradually increased to further increase the overall energy density of the first conductive layer 11.

In an embodiment, the first conductive layer 11 further includes a second side 114. The second side 114 is an edge portion of the first conductive layer 11, and the second side 114 and the first side 111 are disposed opposite to each other on both sides of the first conductive layer 11. Further, the second side 114 and the first boundary M refer to the same structure. The second side 114 is also to better illustrate the component and structure of the first conductive layer 11, and the first boundary M is to better distinguish between the first conductive layer 11 and the first bending portion 12.

In an embodiment, the first conductive layer 11 further includes a second region 116. The second region 116 is located between the second side 114 and the first region 112, and connects the second side 114 and the first region 112. Further, the second region 116 is a region between the second side 114 and a dotted line that is of the two dotted lines used as boundaries of the first region 112 in FIG. 3 and that is closer to the second side 114 than to the first side 111. A structure of the second region 116 is substantially the same as the structure of the second region 113. Therein, "substantially the same" should be understood to mean that the main component and structure of the objects described are the same, but reasonable differences are also allowed. It may be understood that, in other embodiments, the second region 116 and the second region 113 may have different structures.

The first conductive layer 11 further includes first side edges 115 and 115'. In this embodiment, the first side edge 115 and the first side edge 115' are approximately symmetrically arranged. Two ends of the first side edge 115, as well as two ends of the first side edge 115', are respectively connected to the first side 111 and the second side 114, and the first side edges 115 and 115' are edge portions of the first region 112 and the second regions 113 and 116. Therein, "approximately symmetrically arranged" should be understood to include the case of symmetry as well as the case where there is a certain dimensional deviation between first side edges 115 and 115'. For example, there is a deviation of ±5° between the first side edges 115 and 115' along the third direction X. It may be understood that, in other embodiments, the first side edge 115 and the first side edge 115' may alternatively be asymmetric structures, and an angle may be formed between them, so that the first conductive layer 11 has a different shape.

Further, the first side edges 115 and 115' tend to be linear.

Figure 4:
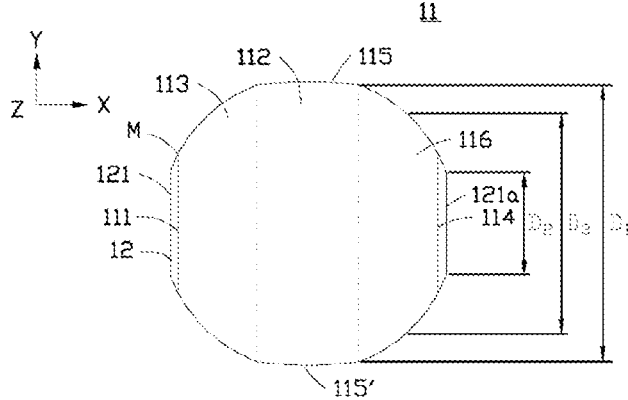
FIG. 4 is a schematic vertical view of an arc-shaped first side edge according to another embodiment of this application.

Referring to FIG. 4, in an embodiment, the first side edges 115 and 115' may alternatively be arc-shaped. Along the third direction X, the first side edges 115 and 115' gradually extend from an end of the first side 111 toward an end of the first region 112, and then gradually extend from the first region 112 toward an end of the second side 114.

Referring to FIG. 3, in an embodiment, when the first conductive layers 11 are stacked along the first direction Z, the first sides 111 of all the first conductive layers 11 may overlap. Then at least one portion of the plurality of first conductive layers 11 may overlap, so that the space utilization of the secondary battery 1 may be increased. The overlap described herein includes a case in which there is a deviation between first sides 111.

Figure 5:
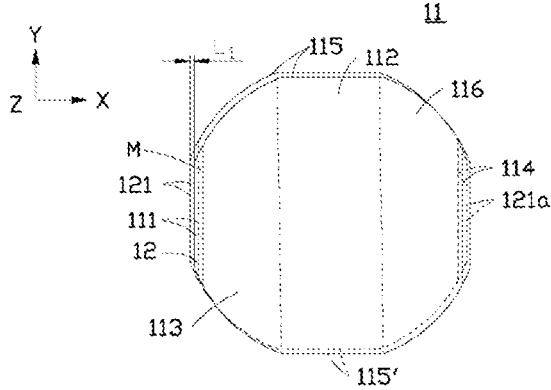
FIG. 5 is a schematic vertical view of a stacked first conductive layer according to another embodiment.

FIG. 5 may be regarded as a state that two first conductive layers 11 are not completely overlapped. When the first conductive layers 11 are stacked along the first direction Z, some of the first sides 111 may overlap, so that some of the first side edges 115 and 115' overlap.

The first side 111, the first region 112, the second region 113, the second side 114, and the first side edges 115 and 115' are integrally formed. It may be understood that, in other embodiments, the first side edges 115 and 115' are not limited to the linear and curved shapes described above.

Referring to FIG. 2 and FIG. 3 again, viewed along the first direction Z, the first edge 121 of the first bending portion 12 is parallel to the first side 111. Therein, "parallel" should be understood to include the case where there is no angle or a small angle between the first edge 121 and the first side 111. For example, there is a deviation of ±5° between the first edge 121 and the first side 111. The first bending portion 12 is bent toward the third direction X, and the first bending portion 12 is located outside the two first conductive layers 11.

Figure 6:
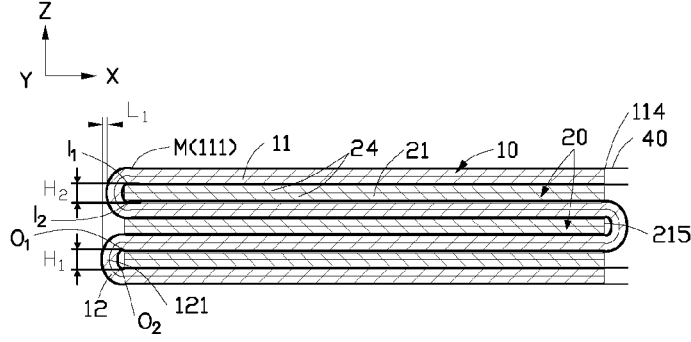
FIG. 6 is a schematic partial cross-sectional view of a secondary battery according to another embodiment.

Referring to FIG. 5 and FIG. 6, along the third direction X, a distance $L_1$ is generated between the non-overlapped first edge 121 and the first edge 121 at the overlapped position, so that some of the first sides 111, as well as some of the first side edges 115 and 115', are not overlapped. $L_1$ is less than or equal to 3 mm, which may, for example, enable the secondary battery 1 to decrease a possibility of increasing in size. Further, for example, when there is $L_1$, a connection position of the first bending portion 12 and the first conductive layer 11 connected to the first bending portion 12 and a connection position of the adjacent first bending portion 12 and the first conductive layer 11 connected to the adjacent first bending portion 12 are staggered, thereby reducing an overall height of the secondary battery 1, which is conducive to the increase of the energy density of the secondary battery 1.

Referring to FIG. 6, viewed along the first direction Z, the first bending portion 12 has a length greater than a distance between two adjacent first sides 111. Specifically, in the first direction Z, the first bending portion 12 has a first distance $H_1$, which is the distance between the two ends of the inner bending portion of the first bending portion 12, i.e., the distance of the first point $O_1$ and the second point $O_2$. The distance between the two adjacent first sides 111 is a second distance $H_2$, which is the distance between the third point $I_1$ and the fourth point $I_2$. The first distance $H_1$ is greater than the second distance $H_2$. Based on this arrangement, the first bending portion 12 is easier to be bent, and an electrolyte may be filled in the inner side of the first bending portion 12, which may enhance strength of the first bending portion 12 while supporting the first bending portion 12.

It may be understood that, in an embodiment, to increase space utilization at the edge of the secondary battery 1, the first distance $H_1$ may be the maximum distance of the first bending portion 12 in the first direction Z. A larger distance between edges of the secondary battery 1 may be avoided when viewed along the first direction Z by making the first distance $H_1$ equal to the second distance $H_2$.

Referring to FIG. 6, in an embodiment, viewed along the first direction Z, some of the first bending portions 12 overlap. If the first distance $H_1$ is greater than the second distance $H_2$, the non-overlapped first bending portions 12 and the overlapped first bending portions 12 may be complementary along the first direction Z, to increase space utilization of the secondary battery 1 along the first direction Z.

Figure 7:
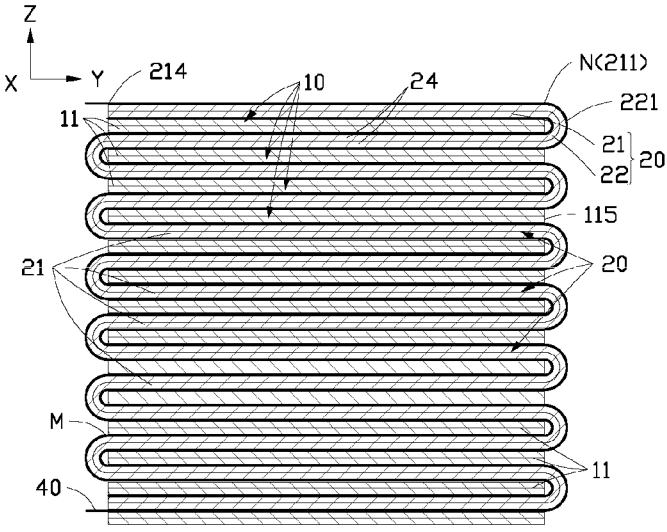
FIG. 7 is a schematic cross-sectional view of the secondary battery shown in FIG. 1 along a B-B direction.

Referring to FIG. 7, the plurality of second conductive layers 21 included in the second electrode sheet 20 are stacked along the first direction Z. The second bending portions 22 are located on both sides of the second conductive layer 21 for connecting two adjacent second conductive layers 21, and each of the second bending portions 22 is connected to the second conductive layer 21 at the position of the second boundary N.

In an embodiment, the second conductive layers 21 and the plurality of second bending portions 22 may be an integrally formed structure, so that the second electrode sheet 20 may be bent and stacked more conveniently.

Figure 8:
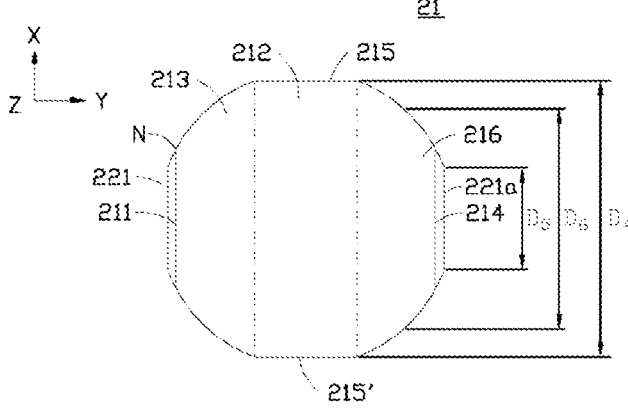
FIG. 8 is a schematic vertical view of a stacked second electrode sheet.

Referring to FIG. 8, the second conductive layer 21 is viewed along the first direction Z. The second conductive layer 21 includes a third side 211 and a third region 212. The third side 211 is an edge portion of the second conductive layer 21. Further, the third side 211 and the second boundary N refer to the same structure. The third side 211 is to better illustrate the component and structure of the second conductive layer 21, and the second boundary N is to better distinguish between the second conductive layer 21 and the second bending portion 22. The third region 212 is approximately located at the middle of the second conductive layer 21. Specifically, the third region 212 is a region between two dotted lines in FIG. 8.

In the third direction X, a length of the third region 212 is $D_4$, a length of the third side 211 is $D_5$, and $D_4$ is greater than $D_5$. In other words, an area of the middle of the second conductive layer 21 is increased compared to an area of the edge, and an overall area of the second conductive layer 21 is increased, so that energy density of the second conductive layer 21 is increased.

Referring to FIG. 8, in an embodiment, the second conductive layer 21 further includes a fourth region 213. The fourth region 213 is located between the third side 211 and the third region 212, and connects the third side 211 and the third region 212. Further, the fourth region 213 is a region between the third side 211 and a dotted line that is of the two dotted lines used as boundaries of the third region 212 in FIG. 8 and that is closer to the third side 211 than to a fourth side 214. In the third direction X, a length of the fourth region 213 is $D_6$, and $D_6$ is between $D_4$ and $D_5$, that is, the length of the fourth region 213 is greater than the length of the third side 211 and less than the length of a third region 212.

In an embodiment, the second conductive layer 21 further includes a fourth side 214. The fourth side 214 is an edge portion of the second conductive layer 21, and the fourth side 214 and the third side 211 are disposed opposite to each other on both sides of the second conductive layer 21. Further, the fourth side 214 and the second boundary N refer to the same structure. The fourth side 214 is also to better illustrate the structure and component of the second conductive layer 21, and the second boundary N is to better distinguish between the second conductive layer 21 and the second bending portion 22.

In an embodiment, the second conductive layer 21 further includes a fourth region 216. The fourth region 216 is located between the fourth side 214 and the third region 212, and connects the fourth side 214 and the third region 212.

Further, the fourth region 216 is a region between the fourth side 214 and a dotted line that is of the two dotted lines used as boundaries of the third region 212 in FIG. 8 and that is close to the fourth side 214 than to the third side 211. A structure of the fourth region 216 is substantially the same as the structure of the fourth region 213. It may be understood that, in other embodiments, the fourth region 216 and the fourth region 213 may have different structures.

The second conductive layer 21 further includes second side edges 215 and 215'. In this embodiment, the second side edge 215 and the second side edge 215' are approximately symmetrically arranged. Two ends of the second side edge 215, as well as two ends of the second side edge 215', are respectively connected to the third side 211 and the fourth side 214, and the second side edges 215 and 215' are edge portions of the third region 212 and the fourth regions 213 and 216. It can be understood that, in other embodiments, the second side edge 215 and the second side edge 215' may alternatively be asymmetric structures, and an angle may be formed between them, so that the second conductive layer 21 has a different shape.

Further, the second side edges 215 and 215' tend to be linear.

Figure 9:
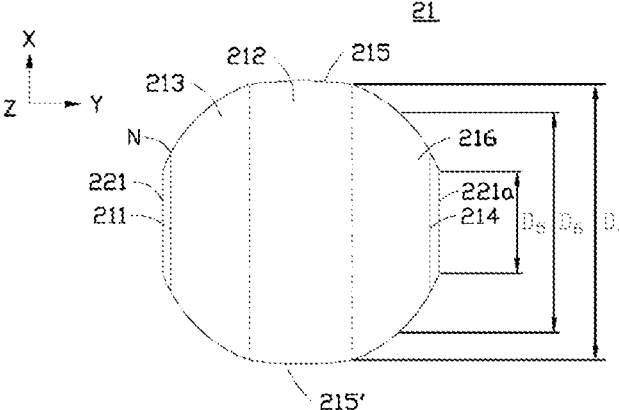
FIG. 9 is a schematic vertical view of an arc-shaped second side edge according to another embodiment of this application.

Referring to FIG. 9, in an embodiment, the second side edges 215 and 215' may alternatively be arc-shaped. Along the second direction Y, a distance between the second side edges 215 and 215' gradually increase from an end of the third side 211 toward an end of the third region 212, and then gradually decrease from the third region 212 toward an end of the fourth side 214.

Referring to FIG. 8, in an embodiment, when the second conductive layers 21 are stacked along the first direction Z, the third sides 211 of all the second conductive layers 21 may overlap, and then the plurality of second conductive layers 21 may have at least one portion overlapped with each other. The overlap described herein includes a case in which there is a deviation between third sides 211.

Figure 10:
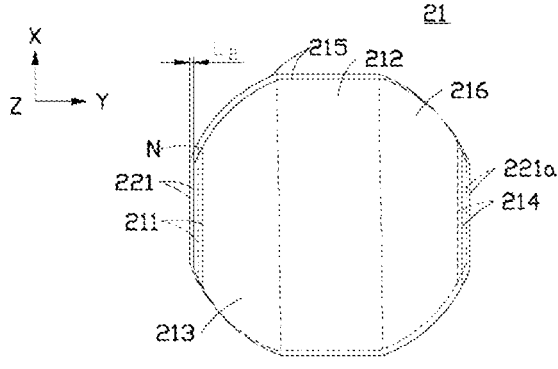
FIG. 10 is a schematic vertical view of a stacked second conductive layer according to another embodiment.

FIG. 10 may be regarded as a state that the two second conductive layers 21 may be not completely overlapped. When the second conductive layers 21 are stacked along the first direction Z, some of the third sides 211 overlap, so that some of the second side edges 215 and 215' may overlap.

The third side 211, the third region 212, the fourth region 213, the fourth side 214, and the second side edges 215 and 215' are also an integrally formed structure. It may be understood that, in other embodiments, the second side edges 215 and 215' are not limited to the linear and curved shapes described above.

Referring to FIG. 7 and FIG. 8 again, viewed along the first direction Z, the second edge 221 of the second bending portion 22 is parallel to the third side 211. The second bending portion 22 is bent toward the second direction Y, and the second bending portion 22 is located outside the two second conductive layers 21.

Figure 11:
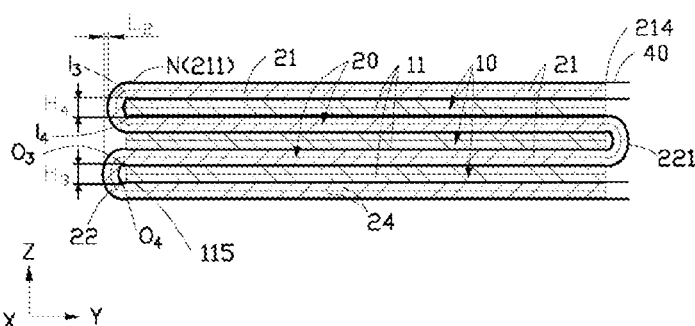
FIG. 11 is a schematic partial cross-sectional view of a secondary battery according to another embodiment.

Referring to FIG. 10 and FIG. 11, in the second direction Y, a distance $L_2$ is generated between the non-overlapped second edge 221 and the second edge 221 at the overlapped position, so that some of the third sides 211 and some of the third side edges 215 and 215' are not overlapped. For example, $L_2$ is less than or equal to 3 mm, which may enable the secondary battery 1 to decrease a possibility of increasing in size. Further, for example, when there is $L_2$, a connection position of the second bending portion 22 and the second conductive layer 21 connected to the second bending portion 22 and a connection position of the adjacent second bending portion 22 and the second conductive layer 21 connected to the adjacent second bending portion 22 are staggered. Thereby reducing an overall height of the secondary battery 1, which is conducive to increase of the energy density of the secondary battery 1.

Referring to FIG. 11, viewed along the first direction Z, the second bending portion 22 has a length greater than a distance between two adjacent third sides 211. Specifically, the second bending portion 22 has a third distance $H_3$, which is the distance between the two ends of the inner bending portion of the second bending portion 22, i.e., the distance of the fifth point $O_3$ and the sixth point $O_4$. The distance between the two adjacent third sides 211 is a fourth distance $H_4$, which is the distance between the seventh point $I_3$ and the eighth point $I_4$. The third distance $H_3$ is greater than the fourth distance $H_4$. Based on this arrangement, the first bending portion 12 is easier to be bent, and an electrolyte may be filled in the inner side of the first bending portion 12, which may enhance strength of the first bending portion 12 while supporting the first bending portion 12.

It may be understood that, in an embodiment, to increase space utilization at the edge of the secondary battery 1, the third distance $H_3$ may be the maximum distance of the second bending portion 22 in the first direction Z. A larger distance between edges of the secondary battery 1 may be avoided when viewed along the first direction Z by making the third distance $H_3$ equal to the fourth distance $H_4$.

Referring to FIG. 11, in an embodiment, viewed along the first direction Z, some of the second bending portions 22 overlap. If the third distance $H_3$ is greater than the fourth distance $H_4$, the non-overlapped second bending portion 22 and the overlapped second bending portion 22 may be complementary along the first direction Z, to increase space utilization of the secondary battery 1 along the first direction Z.

Figure 12:
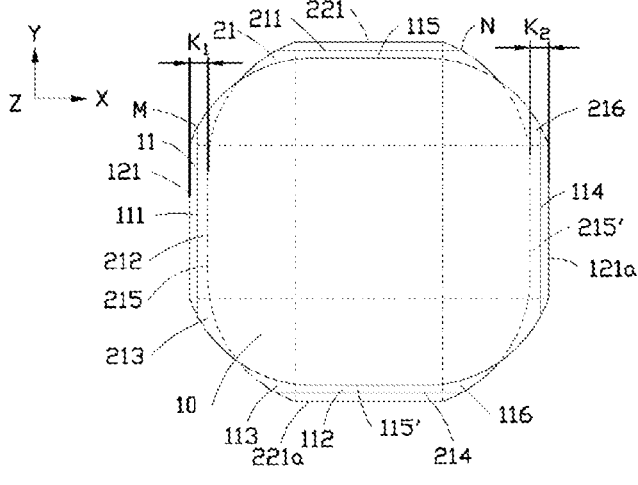
FIG. 12 shows a case in which there is a distance between a stacked first conductive layer and a second conductive layer according to another embodiment.

FIG. 12 shows a distance between the first conductive layer 11 and the second conductive layer 21. A distance between the first edge 121 closer to the first side 111 than to the second side 114 and the second conductive layer 21 is $K_1$, and a distance between the first edge 121a closer to the second side 114 than to the first side 111 and the second conductive layer 21 is $K_2$, and $K_1$ may be different from $K_2$. $K_1$ is the distance between the first edge 121 and the second side edge 215 of the second conductive layer 21 in the third direction X, and $K_2$ is the distance between the first edge 121a and the second side edge 215' of the second conductive layer 21 in the third direction X. When another structure is provided on the first conductive layer 11, if $K_1$ is greater than $K_2$, the other structure may be disposed on one side of the second side 114 of the first conductive layer 11. So that during stacking, the other structure may be more fixed when the second conductive layer 21 is disposed on the first conductive layer 11.

For example, a sum of $K_1$ and $K_2$ may be less than or equal to 3 mm. Setting the sum of $K_1$ and $K_2$ to be less than or equal to 3 mm may decrease a possibility tahn the first sides 111 or second sides 114 of the two adjacent first conductive layers 11 may contact each other and cause short-circuit. Further, the secondary battery 1 may be enabled to decrease a possibility of increasing in size. In an embodiment, the sum of $K_1$ and $K_2$ is 0.5 mm, 1 mm, 1.5 mm, 2 mm, or 2.5 mm. It may be understood that, in other embodiments, the sum of $K_1$ and $K_2$ is not limited thereto.

Figure 13:
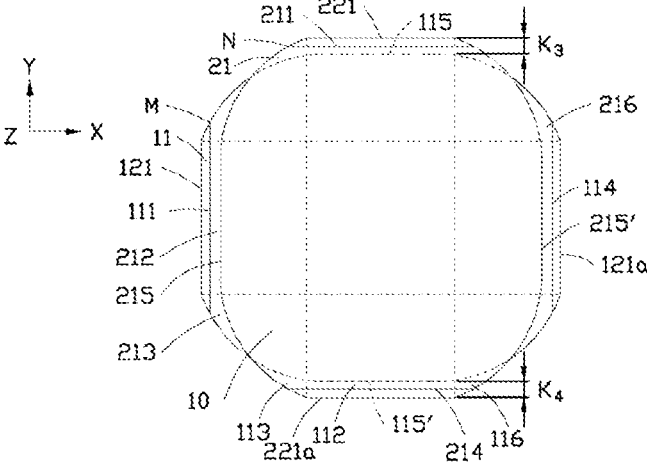
FIG. 13 shows a case in which there is a distance between a stacked second conductive layer and a first conductive layer according to another embodiment.

FIG. 13 shows a state that there is a distance between the second conductive layer 21 and the first conductive layer 11. A distance between the second edge 221 closer to the third side 211 than to the fourth side 214 and the first conductive layer 11 is $K_3$, and a distance between the second edge 221a closer to the fourth side 214 than to the third side 211 and the first conductive layer 11 is $K_4$, and $K_3$ is different from $K_4$. $K_3$ is the distance between the second edge 221 and the first side edge 115 of the first conductive layer 11, and $K_4$ is the distance between the second edge 221a and the first edge 115' of the first conductive layer 11. For example, a sum of $K_3$ and $K_4$ is less than or equal to 3 mm. Setting the sum of $K_3$ and $K_4$ to be less than or equal to 3 mm may decrease a possibility that the third sides 211 or fourth sides 214 of the two adjacent second conductive layers 21 may contact each other and cause short-circuit. Further, the secondary battery 1 may be enabled to decrease a possibility of increasing in size. In an embodiment, the sum of $K_3$ and $K_4$ is 0.5 mm, 1 mm, 1.5 mm, 2 mm, or 2.5 mm. It may be understood that, in other embodiments, the sum of $K_3$ and $K_4$ is not limited thereto.

Figure 14:
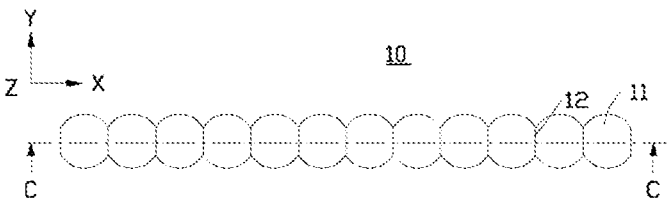
FIG. 14 is a schematic diagram of an unfolded first electrode sheet according to an embodiment of this application.
Figure 15:
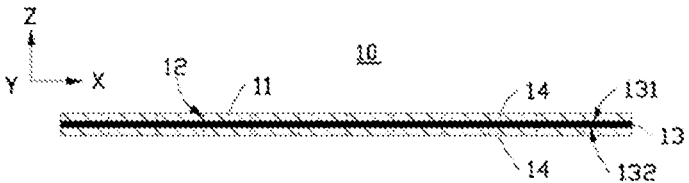
FIG. 15 is a schematic cross-sectional view of the first electrode sheet in FIG. 14 along a C-C direction.

Referring to FIG. 14 and FIG. 15, the first electrode sheet 10 includes a first metal layer 13 and a first material layer 14. FIG. 14 and FIG. 15 schematically show the structure of the first electrode sheet 10 in its unfolded state. The first metal layer 13 includes a first surface 131 and a second surface 132. The first material layers 14 are disposed on the first surface 131 and the second surface 132, and the first conductive layer 11 and the first bending portion 12 are formed by bending the first metal layer 13. The first conductive layer 11 and the first bending portion 12 are finally formed structures included in the first electrode sheet 10 when the first electrode sheet 10 has been formed, and the first metal layer 13 and the first material layer 14 are the structures forming the first electrode sheet 10.

Figure 16:
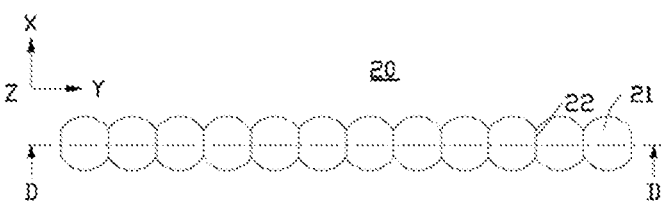
FIG. 16 is a schematic diagram of an unfolded second electrode sheet according to an embodiment of this application.
Figure 17:
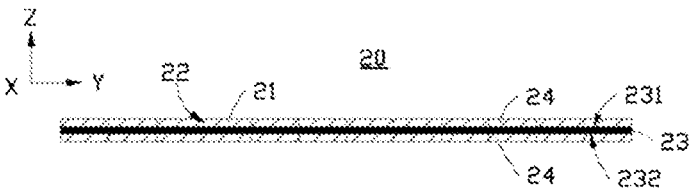
FIG. 17 is a schematic cross-sectional view of the second electrode sheet in FIG. 16 along a D-D direction.

Referring to FIG. 16 and FIG. 17, the second electrode sheet 20 includes a second metal layer 23 and a second material layer 24. FIG. 16 and FIG. 17 schematically show the structure of the second electrode sheet 20 in its unfolded state. The second metal layer 23 includes a third surface 231 and a fourth surface 232. The second material layers 24 are disposed on the third surface 231 and the fourth surface 232, and the plurality of second conductive layers 21 and the plurality of second bending portions 22 are formed by bending the second metal layer 23. Same as the first electrode sheet 10, the plurality of second conductive layers 21 and the plurality of second bending portions 22 are finally formed structures included in the second electrode sheet 20 when the second electrode sheet 20 has been formed, and the second metal layer 23 and the second material layer 24 are the structures forming the second electrode sheet 20.

Figure 18:
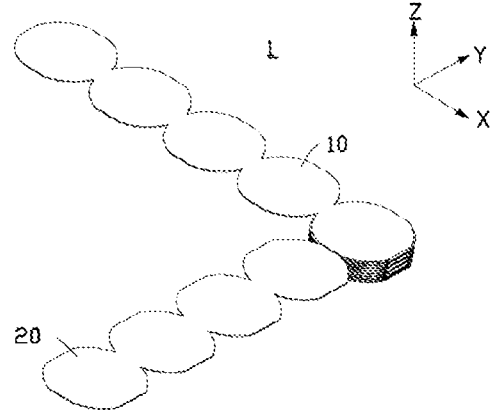
FIG. 18 is a three-dimensional schematic diagram of the stacked first electrode sheet and second electrode sheet according to the first embodiment of this application.

Referring to FIG. 15, FIG. 17, and FIG. 18. In this embodiment, ends of the first metal layer 13 provided with the first material layer 14 and ends of the second metal layer 23 provided with the second material layer 24 are stacked along the first direction Z. Then the first metal layer 13 is bent back and forth along the third direction X, the second metal layer 23 is bent back and forth along the second direction Y The first metal layer 13 and the second metal layer 23 are alternately stacked, to form the secondary battery 1 finally.

Preferably, in this embodiment, the first direction Z, the second direction Y, and the third direction X are perpendicular to each other. It may be understood that, in other embodiments, the second direction Y and the third direction X may be at another angle, and the angle may be 80°, 81°, 82°, 83°, 84°, 85°, 86°, 87°, 88°, 89°, 91°, 92°, 93°, 94°, 95°, 96°, 97°, 98°, 99°, or 100°.

Figure 19:
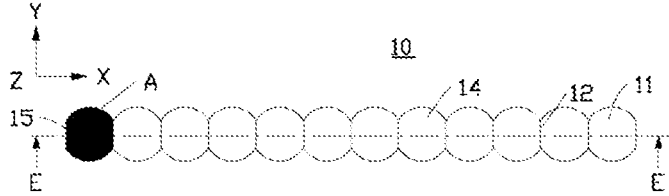
FIG. 19 is a schematic cross-sectional view of the first electrode sheet exposing a first metal layer according to the first embodiment of this application.
Figure 20:
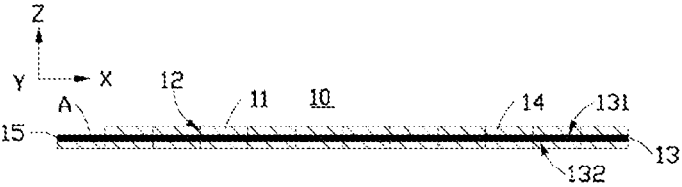
FIG. 20 is a schematic cross-sectional view of the first electrode sheet in FIG. 19 along an E-E direction.
Figure 21:
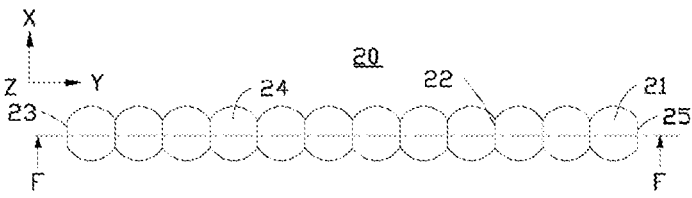
FIG. 21 is a schematic cross-sectional view of the second electrode sheet exposing a second metal layer according to the first embodiment of this application.
Figure 22:
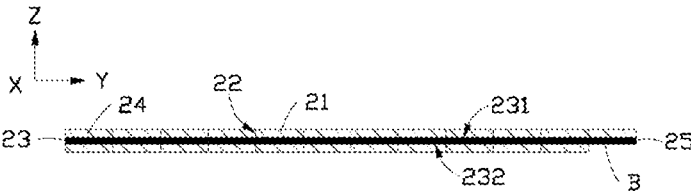
FIG. 22 is a schematic cross-sectional view of the second electrode sheet in FIG. 21 along an F-F direction.

Referring to FIG. 19 and FIG. 20, the first electrode sheet 10 includes a first metal layer 13 and a first material layer 14. FIG. 19 and FIG. 20 schematically show the structure of the first electrode sheet 10 in its unfolded state. In this embodiment, the first electrode sheet 10 enable the secondary battery 1 to be directly electrically connected to a package structure packaging the secondary battery 1. In an embodiment, the first electrode sheet 10 includes a first end portion 15, the first surface 131 includes a fifth region A extending from the first end portion 15, and the fifth region A exposes at least one portion of the first surface 131 of the first metal layer 13. Referring to FIG. 21 and FIG. 22, the second electrode sheet 20 includes a second metal layer 23 and a second material layer 24. FIG. 21 and FIG. 22 schematically show the structure of the second electrode sheet 20 in its unfolded state. In this embodiment, the second electrode sheet 20 includes a second end portion 25. The second end portion 25 is located on a side of the second electrode sheet 20 farther away from the first end portion 15, the third surface 231 includes a sixth region B extending from the second end portion 25, and the sixth region B exposes at least one portion of the surface of the second metal layer 23. This exposure is only relative to other positions of the fifth region A or the sixth region B. Because the metal layer at other positions is covered by the material layer, the metal layer at the position of the fifth region A and the sixth region B is exposed relative to the covered metal layer.

Referring to FIG. 23, after the secondary battery 1 is formed through folding, the fifth region A and the sixth region B are located at two opposite ends of the secondary battery 1 in the first direction Z, respectively.

Figure 26:
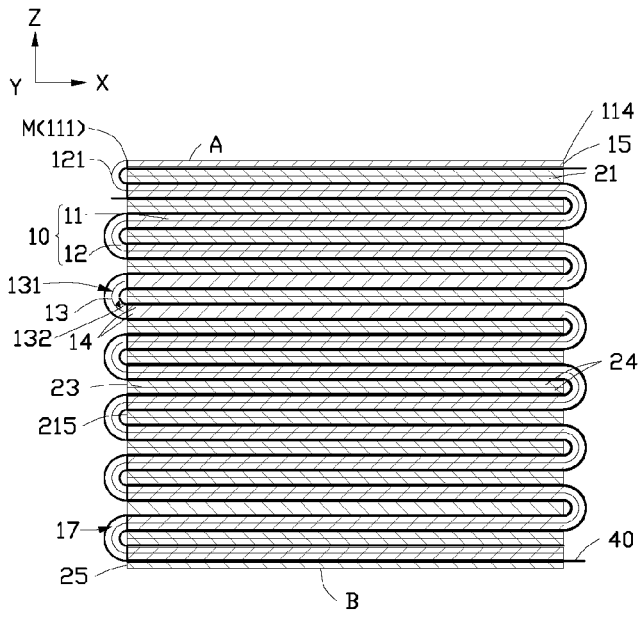
FIG. 26 is a schematic cross-sectional view of the first electrode sheet in FIG. 24 after being stacked.

Referring to FIG. 24 and FIG. 25, which schematically show the structure of the first electrode sheet 10 in its unfolded state. The first metal layer 13 includes the first surface 131 and the second surface 132, and a plurality of the first material layers 14 are arranged on the first surface 131 and the second surface 132. In this embodiment, the exposed surface between the first material layers 14 is defined as a first exposed portion 17. The term "exposed" described here means that a portion of the first metal layer 13 is exposed from the first material layer 14, and does not negate the fact that the first exposed portion 17 is covered by the electrolyte and the package. Referring FIG. 26, the first exposed portion is located at each the first bending portion 12. For example, at the position of the first bending portion 12, the first material layer 14 on a surface of the first metal layer 13 may be removed through intermittent coating, laser cleaning, scraping, or the like. Removing the first material layer 14 at the position of the first bending portion 12 may ensure that, for example, occurrence of lithium precipitation may be suppressed when the secondary battery 1 is used in a high-power charging scenario. Moreover, the bent first material layer 14 may also be enabled to decrease a possibility of easily falling off from the first metal layer 13, and other effects of this phenomenon on the secondary battery 1 may also be suppressed.

Figure 27:
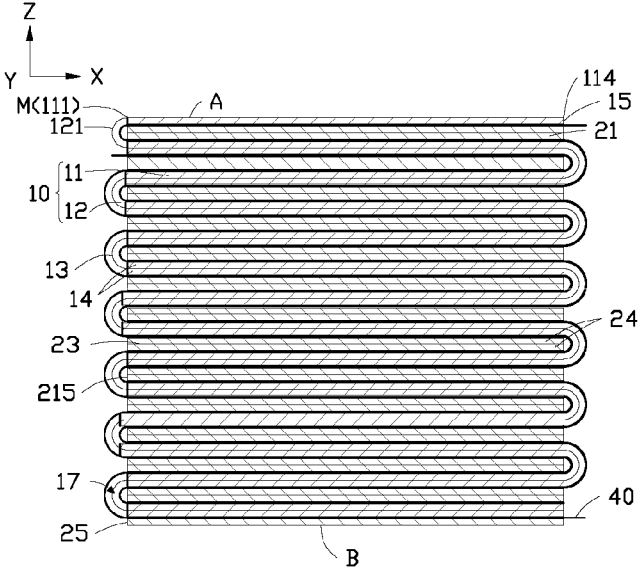
FIG. 27 is a schematic cross-sectional view of the first electrode sheet in FIG. 24 after being stacked in another embodiment.

Referring to FIG. 27, the first exposed portion 17 has different opening distances. And further, a distance of the first metal layer 13 exposed on the first bending portion 12 ranges from 0.2 mm to 5 mm. That is, the opening distance of the first exposed portion 17 is 0.2 mm to 5 mm. Specifically, the distance of the first exposed portion 17 may be 0.5 mm, 1 mm, 1.5 mm, 2 mm, 2.52 mm, 3.2 mm, 3.52 mm, 4.2 mm, or 4.5 mm. For example, disposing the first exposed portion 17 may reduce an overall height of the secondary battery 1 along the first direction Z, thereby increasing the energy density.

Figure 28:
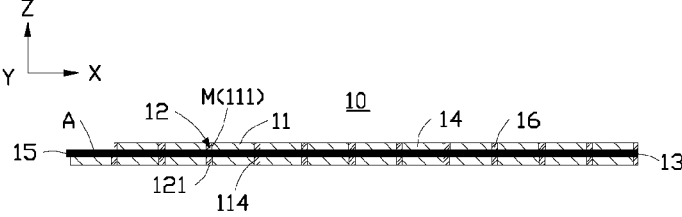
FIG. 28 is a schematic cross-sectional view showing a first layer disposed at a position of a first bending portion of the first electrode sheet shown in FIG. 25.
Figure 29:
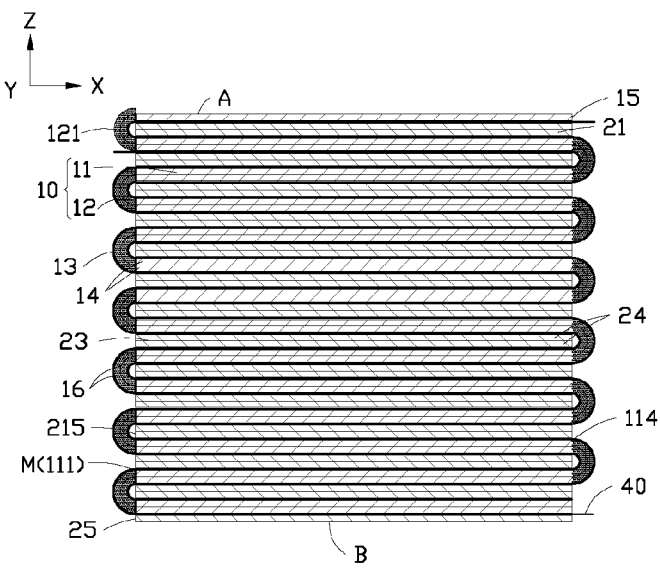
FIG. 29 is a schematic cross-sectional view of the first electrode sheet in FIG. 28 after being stacked.

Referring to FIG. 28 and FIG. 29, in an embodiment, the first bending portion 12 is provided with a first layer 16 including an insulation material at a position of the first exposed portion 17. The first layer 16 covers the first surface 131 of the first metal layer 13 at the position of the first exposed portion 17. For example, to suppress a short circuit caused when the first electrode sheet 10 comes into contact with the second electrode sheet 20 due to damage and failure occurring at the position of the first bending portion 12 in the case of mechanical abuse of the secondary battery 1.

Figure 30:
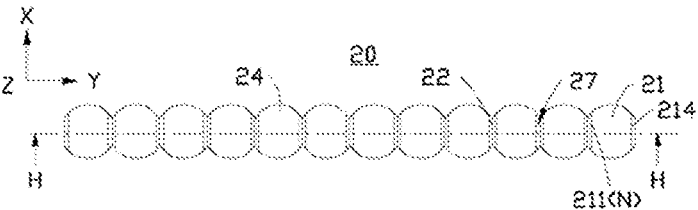
FIG. 30 is a schematic vertical view of the unfolded second electrode sheet in FIG. 17 with an active layer on a second bending portion removed.
Figure 31:
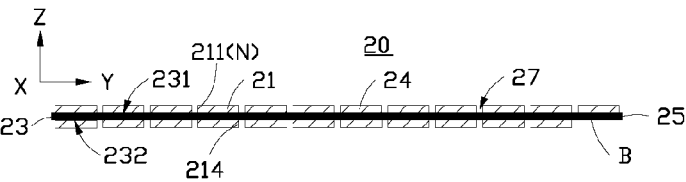
FIG. 31 is a schematic cross-sectional view of the second electrode sheet in FIG. 30 along an H-H direction.
Figure 32:
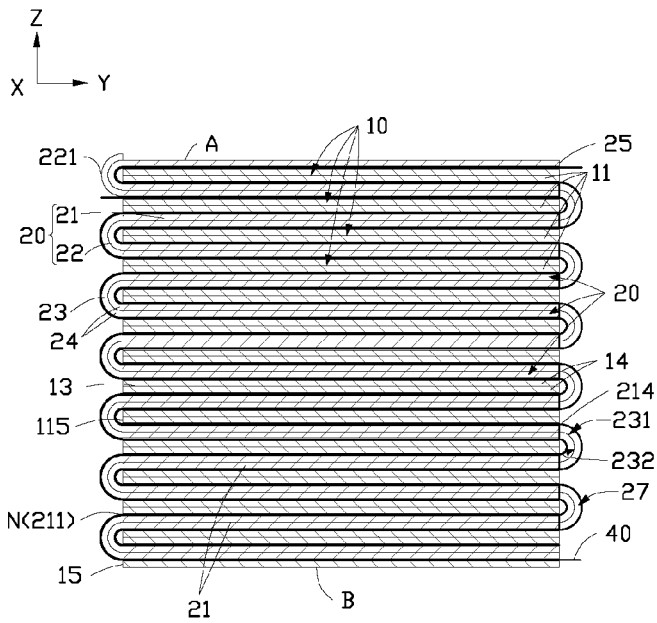
FIG. 32 is a schematic cross-sectional view of the second electrode sheet in FIG. 31 after being stacked.

Referring to FIG. 30 and FIG. 31, which schematically show the structure of the second electrode sheet 20 in its unfolded state. The second metal layer 23 includes the third surface 231 and the fourth surface 232, and a plurality of the second material layers 24 are arranged on the third surface 231 and the fourth surface 232. In this embodiment, the exposed surface between the second material layers 24 is defined as a second exposed portion 27. The term "exposed" described here means that a portion of the second metal layer 23 is exposed from the second material layer 24, and does not negate the fact that the second exposed portion 27 is covered by the electrolyte and the package. Referring FIG. 32, to reduce a risk of getting off of the second material layer 24 at the position of the second bending portion 22, the second bending portion 22 is provided with the second exposed portion 27. The third surface 231 and the fourth surface 232 of the second metal layer 23 are exposed at a position of the second exposed portion 27, and the second material layer 24 may be removed through intermittent coating, laser cleaning, scraping, or the like.

Figure 33:
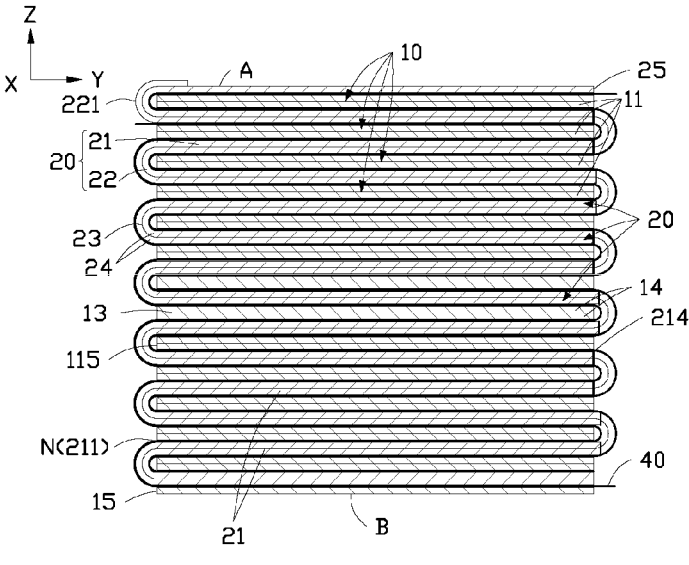
FIG. 33 is a schematic cross-sectional view of the second electrode sheet in FIG. 31 after being stacked in another embodiment.

Referring to FIG. 33, the second exposed portion 27 has different opening distances. And further, a distance of the second metal layer 23 exposed on the second bending portion 22 ranges from 0.1 mm to 5 mm. That is, the opening distance of the second exposed portion 27 is 0.1 mm to 5 mm. Specifically, the distance of the second exposed portion 27 may be 0.5 mm, 1 mm, 1.5 mm, 2 mm, 2.52 mm, 3.2 mm, 3.52 mm, 4.2 mm, or 4.5 mm. For example, disposing the second exposed portion 27 may reduce an overall height of the secondary battery 1 along the first direction Z, thereby increasing the energy density.

Referring to FIG. 15 and FIG. 17, in an embodiment, the first direction Z is a thickness direction of the first material layer 14 and the second material layer 24. A thickness of the first material layer 14 arranged on the first surface 131 is different form a thickness of the first material layer 14 arranged on the second surface 132, and a thickness of the second material layer 24 arranged on the third surface 231 is different from the second material layer 24 arranged on the fourth surface 232.

Specifically, a thickness of the first material layer 14 arranged on the first surface 131 is greater than a thickness of the first material layer 14 arranged on the second surface 132. A thickness of the second material layer 24 arranged on the third surface 231 is greater than a thickness of the second material layer 24 arranged on the fourth surface 232. Setting different thicknesses for the first material layer 14 and the second material layer 24 may further increase overall space utilization of the secondary battery 1.

It may be understood that, in other embodiments, the thickness of the first material layer 14 arranged on the second surface 132 may be greater than the thickness of the first material layer 14 arranged on the first surface 131, and the thickness of the second material layer 24 arranged on the fourth surface 232 may be greater than the thickness of the material layer arranged on the third surface 231; or the thicknesses of the first material layer 14 arranged on the first surface 131 and the second surface 132 may be the same, and the thicknesses of the second material layer 24 arranged on the third surface 231 and the fourth surface 232 may be the same.

In this embodiment, the first electrode sheet 10 is a positive electrode sheet, and the second electrode sheet 20 is a negative electrode sheet. The first metal layer 13 and the second metal layer 23 are current collector layers, and the first material layer 14 and the second material layer 24 are active material layers. In the battery field, current collector layers and active material layers of a positive electrode sheet and a negative electrode sheet are relatively common. For example, aluminum foil is used as the current collector layer of the positive electrode sheet, copper foil is used as the current collector layer of the negative electrode sheet, and the active material layer is coated on the current collector layer to form an electrode sheet.

Figure 34:
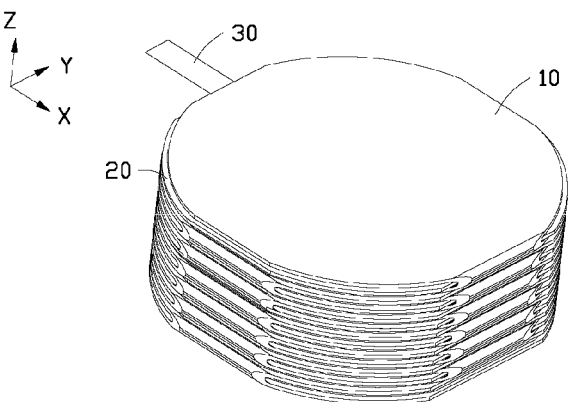
FIG. 34 is a three-dimensional schematic diagram of a secondary battery provided with a conductive sheet according to the first embodiment of this application.

Referring to FIG. 34, the first electrode sheet 10 or the second electrode sheet 20 is provided with a conductive sheet 30. The first electrode sheet 10 or the second electrode sheet 20 may be electrically connected to a package packaging the first electrode sheet 10 or the second electrode sheet 20 through the conductive sheet 30. Further, the conductive sheet 30 is a tab.

Figure 35:
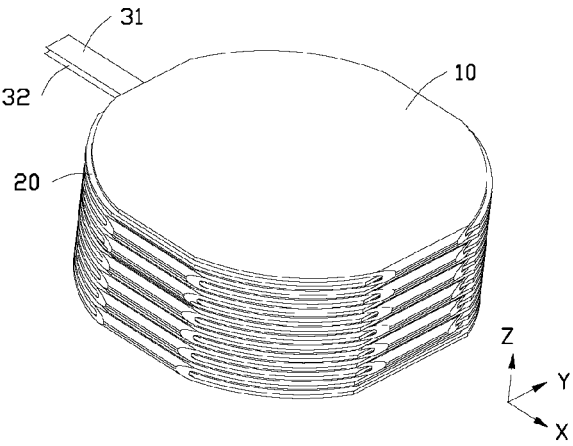
FIG. 35 is a three-dimensional schematic diagram of a secondary battery provided with a first conductive sheet and a second conductive sheet according to another embodiment.
Figure 36:
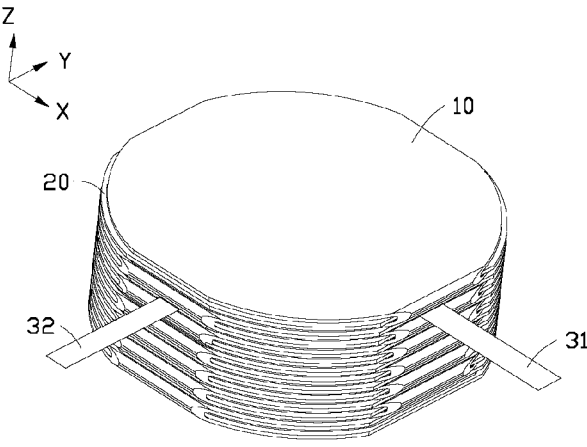
FIG. 36 is a three-dimensional schematic diagram of a secondary battery provided with a first conductive sheet and a second conductive sheet according to another embodiment.
Figure 37:
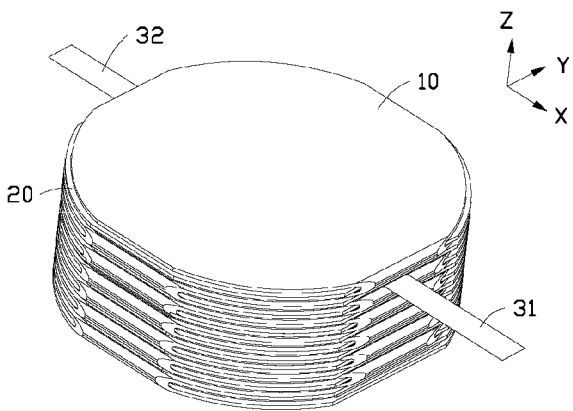
FIG. 37 is a three-dimensional schematic diagram of a secondary battery provided with a first conductive sheet and a second conductive sheet according to another embodiment.

Referring to FIG. 35, FIG. 36, and FIG. 37, in an embodiment, the first electrode sheet 10 is provided with a first conductive sheet 31, and the second electrode sheet 20 is provided with a second conductive sheet 32. Viewed along the first direction Z, a range of an angle $\theta$ between the first conductive sheet 31 and the second conductive sheet 32 is $0° \leq \theta \leq 180°$.

Specifically, referring to FIG. 35, the first conductive sheet 31 and the second conductive sheet 32 overlap when being viewed along the first direction Z.

Referring to FIG. 36, the angle $\theta$ between the first conductive sheet 31 and the second conductive sheet 32 is 90° when being viewed along the first direction Z.

Referring to FIG. 35, the angle $\theta$ between the first conductive sheet 31 and the second conductive sheet 32 is 180° when being viewed along the first direction Z.

It may be understood that, in other embodiments, the angle $\theta$ may alternatively be other degrees, which may be set depending on specific conditions. Each of the first electrode sheets 10 may be provided with the first conductive sheet 31, and each of the second electrode sheets 20 may be provided with the second conductive sheet 32. The plurality of first conductive sheets 31 are connected, the plurality of second conductive sheets 32 are connected, and all of them are then connected to the package.

Figure 38:
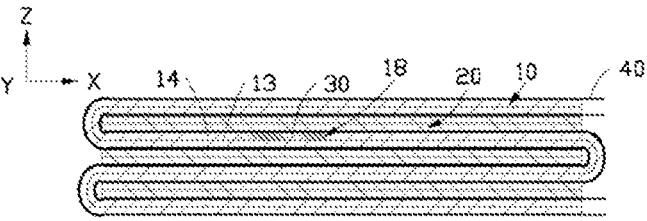
FIG. 38 is a schematic partial cross-sectional view showing a first electrode sheet of the secondary battery shown in FIG. 34 provided with a conductive sheet.
Figure 39:
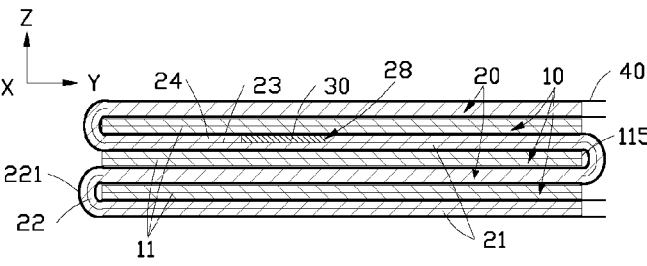
FIG. 39 is a schematic partial cross-sectional view showing a second electrode sheet of the secondary battery shown in FIG. 34 provided with a conductive sheet.

Referring to FIG. 38, when the first conductive sheet 31 is disposed on the first electrode sheet 10 or the second conductive sheet 32 is disposed on the second electrode sheet 20, a part of the first material layer 14 is removed from the first surface 131 or the second surface 132 of the first metal layer 13 to form an first opening 18, and then the first conductive sheet 31 is disposed at a position of the first opening 18 and electrically connected to the first metal layer 13. Referring to FIG. 39, a part of the second material layer 24 is removed from the third surface 231 or the fourth surface 232 of the second metal layer 23 to form an second opening 28, the second conductive sheet 32 is disposed at a position of the second opening 28, and the second conductive sheet 32 is electrically connected to the second metal layer 23.

In this embodiment, the first opening 18 and the second opening 28 are enclosed by a surface of the first metal layer 13 and a side surface of the first material layer 14, or are enclosed by a surface of the second metal layer 23 and a side surface of the second material layer 24.

The first electrode sheet 10 and the second electrode sheet 20 are electrically connected to the package through the first conductive sheet 31 and the second conductive sheet 32, respectively.

Referring to FIG. 2 again, in an embodiment, the secondary battery 1 further includes a separator 40. The separator 40 is disposed between the first electrode sheet 10 and the second electrode sheet 20 for separating the first electrode sheet 10 from the second electrode sheet 20.

The separator 40 may be made of a material that at least includes, but is not limited to, one or more of polyethylene and polypropylene.

Figure 40:
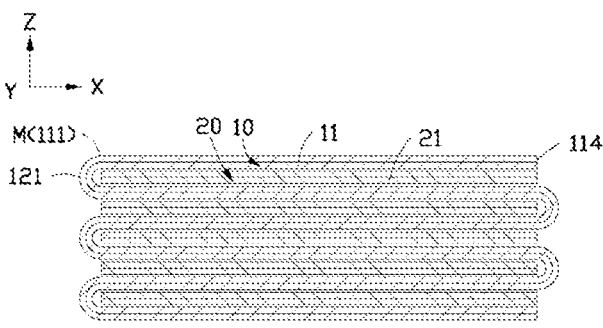
FIG. 40 is a schematic partial cross-sectional view showing the first electrode sheet and the second electrode sheet with no specific-shaped separator provided in between according to the first embodiment of this application.

Referring to FIG. 40, in an embodiment, the separator 40 may be in a solid form. In other words, an electrolyte membrane may be used to replace the separator 40 to separate the first electrode sheet 10 and the second electrode sheet 20, and the electrolyte membrane may also ensure transmission of lithium ions during charge and discharge. The method of using the electrolyte membrane as the separator 40 is the prior art, and is not described herein.

Figure 41:
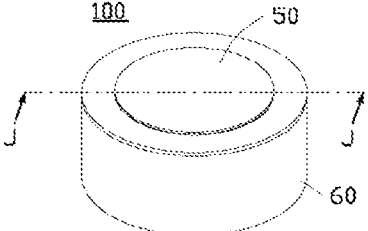
FIG. 41 is a three-dimensional schematic diagram of a battery module according to another embodiment of this application.

Referring to FIG. 41, this application further provides a battery module 100. The battery module 100 includes a first package 50 and a second package 60 matching the first package 50, and the battery module 100 further includes the secondary battery 1 according to any one of the foregoing embodiments. The secondary battery 1 is accommodated in the first package 50 and the second package 60, and is connected to the first package 50 and the second package 60. The battery module 100 uses the secondary battery 1 according to any one of the foregoing embodiments, and therefore has all the beneficial effects of the secondary battery 1. Details are not repeated herein.

Figure 42:
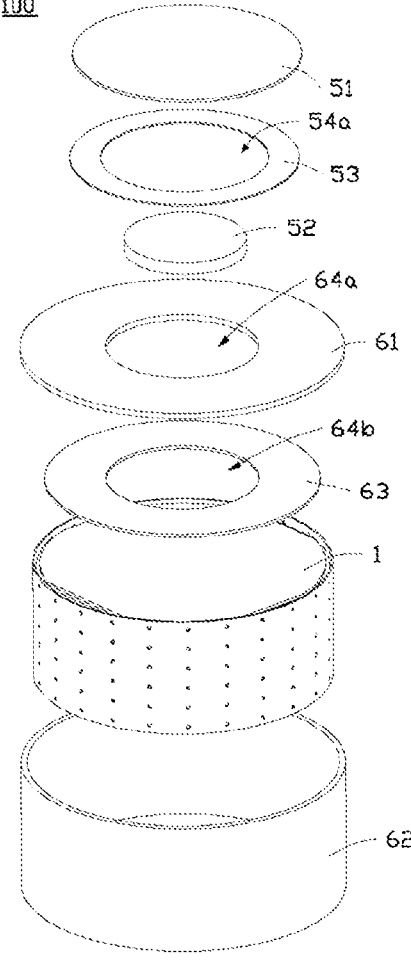
FIG. 42 is a schematic exploded view of the battery module shown in FIG. 41.
Figure 43:
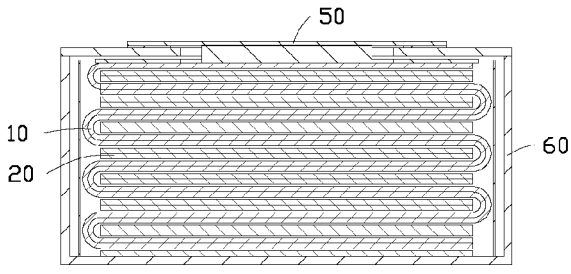
FIG. 43 is a schematic cross-sectional view of the battery module shown in FIG. 41 along a J-J direction.

Referring to FIG. 42 and FIG. 43, the first package 50 includes a first cover body 51, a pole 52, and a first insulator 53. The pole 52 and the first insulator 53 are disposed on a side of the first cover body 51 facing the second package 60, and the pole 52 is configured to connect the secondary battery 1. When the first cover body 51 is disposed on the second package 60, the first insulator 53 is located between the first cover body 51 and the second package 60. The first insulator 53 is configured to insulate the first cover body 51 and the second package 60, and may also be configured to seal the first cover body 51 and the second package 60.

The first insulator 53 is provided with a through hole 54a, and the pole 52 passes through the through hole 54a.

The second package 60 includes a second cover body 61, the shell 62, and a second insulator 63. The secondary cover body 61 is disposed on an end of the shell 62, and the secondary battery 1 is accommodated in the shell 62 and wrapped with an insulation layer (not shown in the figure), to insulate the secondary battery 1 and the shell 62. The second insulator 63 is disposed between the secondary battery 1 and the second cover body 61, and is configured to insulate the second cover body 61 and the secondary battery 1.

The second cover body 61 is provided with a through hole 64a, the second insulator 63 is provided with a through hole 64b, the through hole 64a corresponds to the through hole 64b, and the pole 52 passes through the through hole 64a and the through hole 64b to be connected to the secondary battery 1.

The first package 50 may be directly buckled on the second package 60 to connect the first package 50 and the second package 60. It may be understood that the connection manner of the first package 50 and the second package 60 is not limited thereto.

In this embodiment, the first insulator 53 and the second insulator 63 are insulation spacers. The first package 50 is a positive electrode package, and the second package 60 is a negative electrode package. It may be understood that, in other embodiments, the first insulator 53 and the second insulator 63 may be replaced by other structures with equivalent functions or roles. Polarities of the first package 50 and the second package 60 may be exchanged.

In an embodiment, the first package 50 and the second package 60 may at least be, but are not limited to, made of at least one or more of aluminum plastic film, polyethylene, polypropylene, and polyethylene glycol terephthalate.

In another embodiment, the first package 50 and the second package 60 may at least be, but are not limited to, made of at least one or more of phenolic plastic, polyurethane plastic, epoxy plastic, unsaturated polyester plastic, furan plastic, silicone resin, and propylene-based resin.

In another embodiment, the first package 50 and the second package 60 may at least be, but are not limited to, made of at least one or more of a steel material, an aluminum alloy material, a magnesium alloy material, a copper alloy material, a nickel alloy material, and a titanium alloy material.

In different usage scenarios, different materials may be used to make the first package 50 and the second package 60 according to an actual need. If the shell 62 is required to have a great overall strength, the first package 50 and the second package 60 may be made of steel materials. Both the first package 50 and the second package 60 include conductive materials, so that electrical conduction may be achieved when the battery module 100 is connected to an external structure. Further, a lower part of the first cover body 51 and a lower part of the shell 62 are made of conductive materials.

In this embodiment, the secondary battery 1 may be directly connected to the first package 50 and the second package 60 through the exposed first metal layer 13 and the exposed second metal layer 23. So that in limited space of the first package 50 and the secondary package 60, there is no need to connect the first package 50, the second package 60, and the secondary battery 1 through other structures. This improves space utilization rate of the battery module 100, so that a bigger secondary battery 1 may be accommodated, and energy density of the secondary battery 1 is improved.

Figure 44:
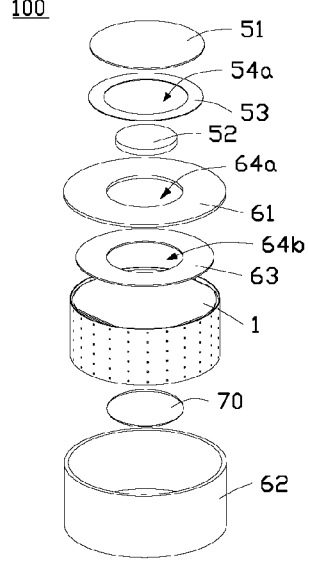
FIG. 44 is a schematic exploded view of a battery module provided with a connector according to another embodiment.
Figure 45:
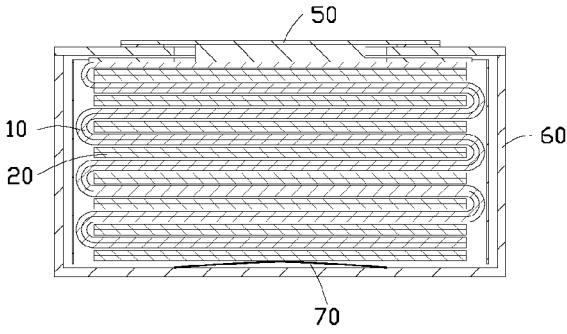
FIG. 45 is a schematic cross-sectional view of the battery module shown in FIG. 44.

Referring to FIG. 44 and FIG. 45, in an embodiment, the battery module 100 further includes a connector 70, where the connector 70 is disposed between the secondary battery 1 and the first package 50, or the connector 70 is disposed between the secondary battery 1 and the second package 60, and the connector 70 is connected to the secondary battery 1, the first package 50, or the second package 60.

Figure 46:
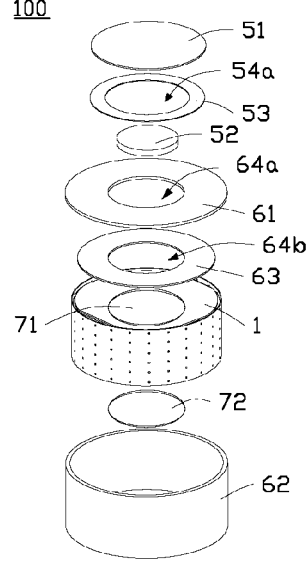
FIG. 46 is a schematic exploded view of a battery module provided with a first connector and a second connector according to another embodiment.
Figure 47:
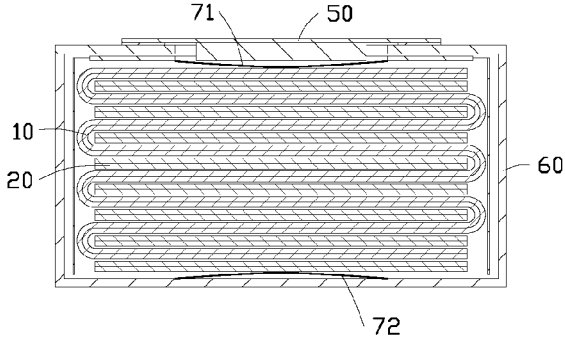
FIG. 47 is a schematic cross-sectional view of the battery module shown in FIG. 46.

Referring to FIG. 46 and FIG. 47, in an embodiment, the battery module 100 may include two connectors 70, and the two connectors 70 are classified into a first connector 71 and a second connector 72. The first connector 71 is connected to the secondary battery 1 and the first package 50, and the second connector 72 is connected to the secondary battery 1 and the second package 60.

The first connector 71 and the second connector 72 are metal domes. Using the metal domes to connect the packages and the secondary battery 1 may improve reliability of a battery cell, and may avoid poor contact, poor deformation of the secondary battery 1, and the like by preventing the exposed metal layer from being directly connected to the shell 62.

It may be understood that, in other embodiments, the first connector 71 and the second connector 72 may be replaced by other structures with equivalent functions or roles.

Figure 48:
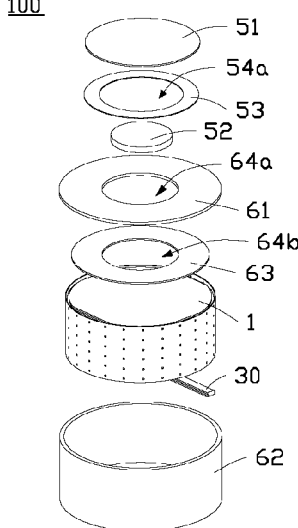
FIG. 48 is a schematic exploded view of a battery module provided with a conductive sheet according to another embodiment.
Figure 49:
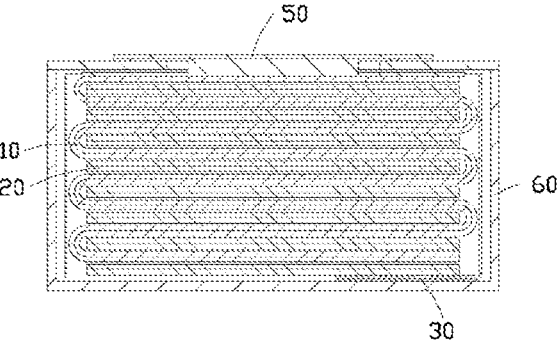
FIG. 49 is a schematic cross-sectional view of the battery module shown in FIG. 48.

Referring to FIGS. 48 and 49, in an embodiment, a conductive sheet 30 is provided on the secondary battery 1, and the secondary battery 1 may be connected to the first package 50 or the second package 60 through the conductive sheet 30. Further, if the first conductive sheet 31 and the second conductive sheet 32 are provided on the secondary battery 1, the secondary battery 1 may be connected to the first package 50 and the second package 60 through the first conductive sheet 31 and the second conductive sheet 32.

It may be understood that, in other embodiments, the secondary battery 1 may be combined with the connector 70 and the conductive sheet 30 through the exposed metal layer, and connected to the first package 50 and the second package 60.

In this application, there are cases where the numerical signs of certain structures or parts are omitted in order to avoid the drawings becoming too complicated. For example, the first electrode sheet 10, the first conductive layer 11, the first side 111, the second side 114, the first side edge 115, the first bending portion 12, the first edge 121, the first boundary M, the first material layer 14, the first layer 16, the second electrode sheet 20, the second conductive layer 21, the third side 211, the fourth side 214, the second side edge 215, the second bending portion 22, the second side edge 221, the second boundary N, the second material layer 24, and other structures will be omitted from the related numerical signs in some of the drawings.

Second Embodiment

Figure 50:
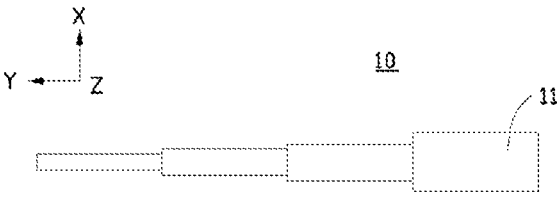
FIG. 50 is a schematic vertical view of an unfolded first electrode sheet according to a second embodiment of this application.
Figure 51:
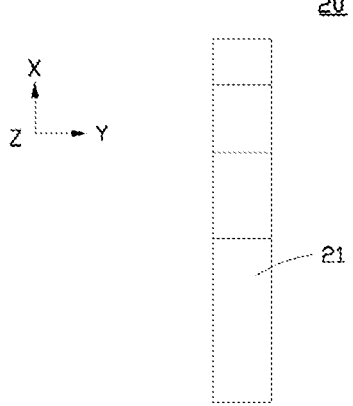
FIG. 51 is a schematic vertical view of an unfolded second electrode sheet according to the second embodiment of this application.
Figure 52:
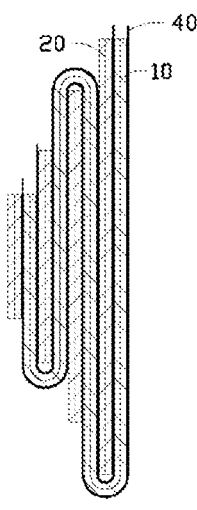
FIG. 52 is a schematic cross-sectional view of the first electrode sheet and the second electrode sheet after being stacked according to the second embodiment of this application.

Referring to FIG. 50, FIG. 51, and FIG. 52, the secondary battery 1 and the battery module 100 in the second embodiment are substantially the same as those in the first embodiment. A difference lies in that the unfolded first electrode sheet 10 is arranged along the second direction Y Viewed along the first direction Z, distances of the plurality of first conductive layers 11 extending along the second direction Y are the same, and the distances of the plurality of first conductive layers 11 extending along the third direction X gradually decrease. The unfolded second electrode sheet 20 is arranged along the third direction X, distances of the plurality of second conductive layers 21 extending along the second direction Y are the same, and the distances of the plurality of second conductive layers 21 extending along the third direction X gradually decrease.

Third Embodiment

Figure 53:
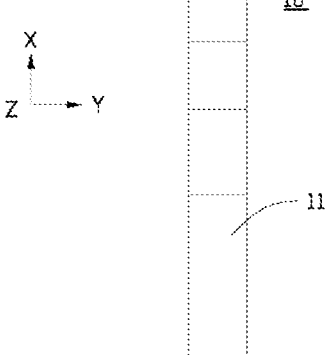
FIG. 53 is a schematic vertical view of an unfolded first electrode sheet according to a third embodiment of this application.
Figure 54:
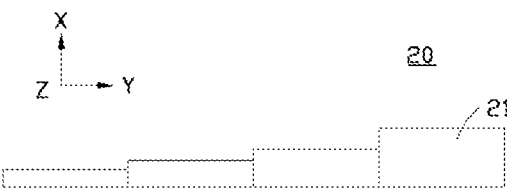
FIG. 54 is a schematic vertical view of an unfolded second electrode sheet according to the third embodiment of this application.
Figure 55:
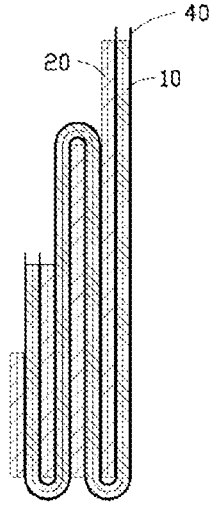
FIG. 55 is a schematic cross-sectional view of the first electrode sheet and the second electrode sheet after being stacked according to the third embodiment of this application.

Referring to FIG. 53, FIG. 54, and FIG. 55, the secondary battery 1 and the battery module 100 in the third embodiment are substantially the same as those in the second embodiment. A difference lies in that the unfolded first electrode sheet 10 is arranged along the third direction X. Viewed along the first direction Z, distances of the plurality of first conductive layers 11 extending along the second direction Y are the same, and the distances of the plurality of first conductive layers 11 extending along the third direction X gradually decrease. The unfolded second electrode sheet 20 is arranged along the third direction Y, and viewed along the first direction Z, distances of the plurality of second conductive layers 21 extending along the second direction Y are the same, and the distances of the plurality of second conductive layers 21 extending along the third direction X gradually decrease.

Fourth Embodiment

Figure 56:
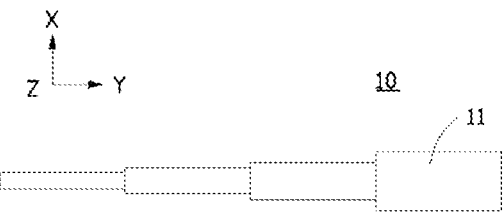
FIG. 56 is a schematic vertical view of an unfolded first electrode sheet according to a fourth embodiment of this application.
Figure 57:
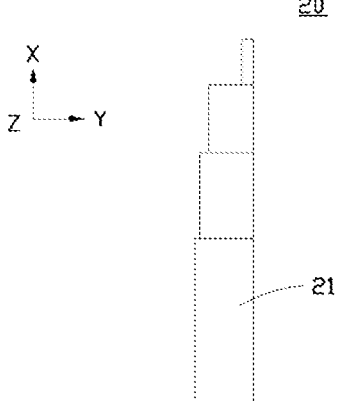
FIG. 57 is a schematic vertical view of an unfolded second electrode sheet according to the fourth embodiment of this application.
Figure 58:
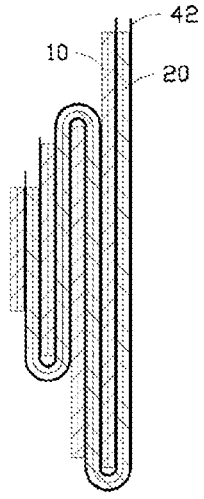
FIG. 58 is a schematic cross-sectional view of the first electrode sheet and the second electrode sheet after being stacked according to the fourth embodiment of this application.

Referring to FIG. 56, FIG. 57, and FIG. 58, the secondary battery 1 and the battery module 100 in the fourth embodiment are substantially the same as those in the first embodiment. A difference lies in that the unfolded first electrode sheet 10 is arranged along the second direction Y Distances of the plurality of first conductive layers 11 extending along the second direction Y gradually decrease, and the distances of the plurality of first conductive layers 11 extending along the third direction X gradually decrease. The unfolded second electrode sheet 20 is arranged along the third direction X, distances of the plurality of second conductive layers 21 extending along the second direction Y gradually decrease, and the distances of the plurality of second conductive layers 21 extending along the third direction X gradually decrease.

Fifth Embodiment

Figure 59:
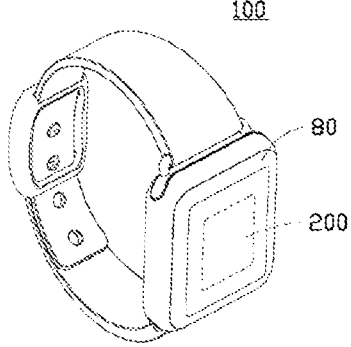
FIG. 59 is a three-dimensional schematic diagram of an electronic device according to a fifth embodiment of this application.

Referring to FIG. 59, this application also provides an electronic apparatus 200. The electronic apparatus 200 includes a main body 80 and a battery module 100 disposed in the main body 80 for supplying power to the main body 80. The battery module 100 is the battery module 100 according to any one of the foregoing embodiments, and therefore has all the beneficial effects of the battery module 100. Details are not repeated herein.

The electronic apparatus 200 may be a Bluetooth headset, a Bluetooth speaker, a smart flashlight, a smart wearable device, or the like.

In conclusion, in the embodiments of this application, the secondary battery 1 and the battery module 100 are provided. The first electrode sheet 10 and the second electrode sheet 20 are alternately stacked in different directions. So that more volumes of the first electrode sheet 10 and the second electrode sheet 20 may be accommodated, in space of the shell 62 of a normal size or a specially required size that packages the secondary battery 1, and the secondary battery 1 has higher capacity.

Based on the foregoing secondary battery and the battery module, the first electrode sheet and the second electrode sheet in the secondary battery are bent back and forth in different directions and stacked. So that along a stacking direction, the first electrode sheet and the second electrode sheet of more sizes can be accommodated, thereby increasing energy density of the secondary battery.

In addition, those of ordinary skill in the art should realize that the foregoing embodiments are merely used to illustrate this application, and not construed as a limitation to this application.

The invention claimed is:

1. A secondary battery, comprising:
   a first electrode sheet; and
   a second electrode sheet;
   wherein the first electrode sheet comprises a plurality of first conductive layers and a plurality of first bending portions, and two adjacent first conductive layers are connected through one of the plurality of first bending portions;
   the second electrode sheet comprises a plurality of second conductive layers and a plurality of second bending portions, and two adjacent second conductive layers are connected through one of the plurality of second bending portions;

the plurality of first conductive layers and the plurality of second conductive layers are alternately stacked;

viewed along a first direction perpendicular to a surface of the first conductive layer, each first bending portion comprises a first edge, the first edge extends along a second direction perpendicular to the first direction, and each second bending portion comprises a second edge, the second edge extends along a third direction perpendicular to the first direction;

each first conductive layer comprises a first side, a second side opposite to the first side, and a first region, and along the third direction, a length of the first region is greater than a length of the first side;

wherein a distance between the first edge closer to the first side than to a second side and the second conductive layer is $K_1$, and a distance between the first edge closer to the second side than to the first side and the second conductive layer is $K_2$, and $K_1$ is different from $K_2$, a sum of $K_1$ and $K_2$ is less than or equal to 3 mm;

viewed from the first direction, at least two of adjacent first edges of first bending portions along a first side of the plurality of first conductive layers do not overlap; and the second direction is different from the third direction;

wherein, in the second direction, a first length of each first conductive layer across a middle section of the each first conductive layer is greater than a second length of the each first conductive layer across a side of the each first conductive layer; and wherein, in the third direction, a third length of the each first conductive layer across a middle section of the each first conductive layer is greater than a fourth length of the each first conductive layer across a side of the each first conductive layer.

2. The secondary battery according to claim 1, wherein the first electrode sheet comprises a first metal layer and a first material layer, the first metal layer comprises a first surface and a second surface, the first material layer is arranged on the first surface and the second surface, and the plurality of first conductive layers and the plurality of first bending portions are formed by bending the first metal layer; and the second electrode sheet comprises a second metal layer and a second material layer, the second metal layer comprises a third surface and a fourth surface, the second material layer is arranged on the third surface and the fourth surface, and the plurality of second conductive layers and the plurality of second bending portions are formed by bending the second metal layer.

3. The secondary battery according to claim 2, wherein the first electrode sheet comprises a first end portion, the first surface comprises a fifth region extending from the first end portion, and the first surface of the first metal layer is exposed from the first material layer at the fifth region.

4. The secondary battery according to claim 3, wherein the second electrode sheet comprises a second end portion, the second end portion is located on a side of the second electrode sheet farther away from the first end portion, the third surface comprises a sixth region extending from the second end portion, and the third surface of the second metal layer is exposed from the second material layer at the sixth region.

5. The secondary battery according to claim 4, wherein at least one portion of the first surface of the first metal layer is exposed from the first material layer at the first bending portion.

6. The secondary battery according to claim 5, further comprising a first layer located on the first surface of the first metal layer where the first metal layer is exposed from the first material layer at the first bending portion, and the first layer comprising an insulating material.

7. The secondary battery according to claim 4, at least one portion of the third surface of the second metal layer is exposed from the second material layer at the second bending portion.

8. The secondary battery according to claim 2, wherein further comprising a third material layer arranged on the second surface of the first metal layer, and a fourth material layer arranged on the fourth surface of the second metal layer, wherein a thickness of the first material layer arranged on the first surface is different from a thickness of the third material layer arranged on the second surface, and a thickness of the second material layer arranged on the third surface is different from a thickness of the fourth material layer arranged on the fourth surface.

9. The secondary battery according to claim 1, wherein the first electrode sheet or the second electrode sheet is provided with a conductive sheet.

10. The secondary battery according to claim 1, wherein the first electrode sheet is provided with a first conductive sheet, and the second electrode sheet is provided with a second conductive sheet; and viewed along the first direction, a range of an angle $\theta$ between the first conductive sheet and the second conductive sheet is $0°\leq\theta\leq180°$.

11. The secondary battery according to claim 10, wherein the first electrode sheet is provided with a first opening, the first conductive sheet is located at the first opening, the second electrode sheet is provided with a second opening, and the second conductive sheet is located at the second opening.

12. The secondary battery according to claim 1, wherein the first conductive layer further comprises a second region, and along the third direction, a length of the second region is between the length of the first region and the length of the first side.

13. The secondary battery according to claim 1, wherein along the first direction, the first bending portion has a distance from a third point to a fourth point in the first direction greater than a distance between two adjacent first sides in the first direction.

14. The secondary battery according to claim 1, wherein some of the first edges are distant from each other in the first direction view.

15. The secondary battery according to claim 1, wherein the first conductive layer further comprises a first side edge, two ends of the first side edge are respectively connected to the first side and the second side, and some of the first side edges are distant from each other in the first direction view.

16. The secondary battery according to claim 1, wherein the second conductive layer comprises a third side and a third region, and along the second direction, a length of the third region is greater than a length of the third side.

17. The secondary battery according to claim 16, wherein the second conductive layer further comprises a fourth region, and along the second direction, a length of the fourth region is between the length of the third region and the length of the third side.

18. The secondary battery according to claim 16, wherein two ends of the second bending portion are respectively connected to a third side of an adjacent second conductive layer, and along the first direction, the second bending portion has a distance from a seventh point to a eighth point in the first direction greater than a distance between two adjacent third sides in the first direction.

19. The secondary battery according to claim 16, wherein the second conductive layer further comprises a fourth side opposite to the third side, and along the third direction, a distance between the third side and the first conductive layer is different from a distance between the fourth side and the first conductive layer.

20. The secondary battery according to claim 19, wherein a distance between the second edge close to the third side and the first conductive layer is $K_3$, a distance between the second edge close to the fourth side and the first conductive layer is $K_4$, and a sum of $K_3$ and $K_4$ is less than or equal to 3 mm.

21. The secondary battery according to claim 16, wherein some of the second edges are distant from each other in the first direction view.

22. The secondary battery according to claim 19, wherein the second conductive layer further comprises a second side edge, two ends of the second side edge are respectively connected to the third side and the fourth side, and some of the second side edges are distant from each other in the first direction view.

23. The secondary battery according to claim 1, wherein along the first direction, some of the second bending portions overlap.

24. The secondary battery according to claim 1, wherein the secondary battery further comprises a separator, and the separator is disposed between the first electrode sheet and the second electrode sheet for separating the first electrode sheet from the second electrode sheet.

25. The secondary battery according to claim 24, wherein the separator is made of a material comprising at least one of polyethylene or polypropylene.

26. The secondary battery according to claim 1, wherein distances of the plurality of first conductive layers extending along the third direction are the same, and distances of the plurality of first conductive layers extending along the second direction gradually decrease;

and distances of the plurality of second conductive layers extending along the third direction are the same, and distances of the plurality of second conductive layers extending along the second direction gradually decrease.

27. The secondary battery according to claim 1, wherein distances of the plurality of first conductive layers extending along the third direction gradually decrease, and distances of the plurality of first conductive layers extending along the second direction gradually decrease;

and distances of the plurality of second conductive layers extending along the third direction gradually decrease, and distances of the plurality of second conductive layers extending along the second direction gradually decrease.

28. A battery module, comprising a first package and a second package matching the first package, wherein the battery module further comprises a secondary battery;

wherein the secondary battery is accommodated in the first package and the second package, and the secondary battery is electrically connected to the first package and the second package respectively;

the secondary battery comprises:

a first electrode sheet; and a second electrode sheet;

wherein the first electrode sheet comprises a plurality of first conductive layers and a plurality of first bending portions, and two adjacent first conductive layers are connected through one of the plurality of first bending portions;

the second electrode sheet comprises a plurality of second conductive layers and a plurality of second bending portions, and two adjacent second conductive layers are connected through one of the plurality of second bending portions;

the plurality of first conductive layers and the plurality of second conductive layers are alternately stacked;

viewed along a first direction perpendicular to a surface of the first conductive layer, each first bending portion comprises a first edge, the first edge extends along a second direction perpendicular to the first direction, and each second bending portion comprises a second edge, the second edge extends along a third direction perpendicular to the first direction;

each first conductive layer comprises a first side, a second side opposite to the first side, and a first region, and along the third direction, a length of the first region is greater than a length of the first side;

wherein a distance between the first edge closer to the first side than to a second side and the second conductive layer is $K_1$, and a distance between the first edge closer to the second side than to the first side and the second conductive layer is $K_2$, and $K_1$ is different from $K_2$, a sum of $K_1$ and $K_2$ is less than or equal to 3 mm;

viewed from the first direction, at least two of adjacent first edges of first bending portions along a first side of the plurality of first conductive layers do not overlap; and the second direction is different from the third direction;

wherein, in the second direction, a first length of each first conductive layer across a middle section of the each first conductive layer is greater than a second length of the each first conductive layer across a side of the each first conductive layer; and wherein, in the third direction, a third length of the each first conductive layer across a middle section of the each first conductive layer is greater than a fourth length of the each first conductive layer across a side of the each first conductive layer.

\* \* \* \* \*